United States Patent
Tamilarasan et al.

(10) Patent No.: US 12,105,636 B2
(45) Date of Patent: Oct. 1, 2024

(54) CACHING TECHNIQUES USING A DATA DEDUPLICATION CACHE AND A DATA CACHE

(71) Applicant: Dell Products L.P., Hopkinton, MA (US)

(72) Inventors: Ashok Tamilarasan, Shrewsbury, MA (US); Philippe Armangau, Acton, MA (US); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/715,459

(22) Filed: Apr. 7, 2022

(65) Prior Publication Data
US 2023/0325324 A1 Oct. 12, 2023

(51) Int. Cl.
*G06F 13/28* (2006.01)
*G06F 3/06* (2006.01)
*G06F 12/0871* (2016.01)
*G06F 12/0888* (2016.01)
*G06F 12/1045* (2016.01)

(52) U.S. Cl.
CPC ........ *G06F 12/1054* (2013.01); *G06F 3/0611* (2013.01); *G06F 3/0641* (2013.01); *G06F 3/0683* (2013.01); *G06F 12/0871* (2013.01); *G06F 12/0888* (2013.01); *G06F 13/28* (2013.01); *G06F 2212/604* (2013.01)

(58) Field of Classification Search
None
See application file for complete search history.

(56) References Cited

U.S. PATENT DOCUMENTS

| | | | | |
|---|---|---|---|---|
| 9,390,116 B1* | 7/2016 | Li | ........................ | G06F 16/2272 |
| 9,582,421 B1* | 2/2017 | Agarwala | ............. | G06F 3/0689 |
| 10,564,850 B1* | 2/2020 | Gud | ...................... | G06F 3/0608 |
| 11,204,870 B2* | 12/2021 | Kucherov | ........... | G06F 12/0873 |
| 11,403,212 B1* | 8/2022 | Singha | ................ | G06F 9/45558 |

(Continued)

OTHER PUBLICATIONS

Jim Handy. The Cache Memory Book. 1998. Academic Press. 2nd ed. pp. 50-63, 88-95.*

(Continued)

*Primary Examiner* — Nathan Sadler
(74) *Attorney, Agent, or Firm* — Muirhead and Saturnelli, LLC

(57) ABSTRACT

A data storage system can include a deduplicated data cache used to store unique deduplicated data portions. Data portions can be promoted to the deduplicated data cache in connection with servicing I/O operations. Servicing the I/O operation that reads data from, or writes data to, a logical address can include determining whether a data portion stored at the logical address meets criteria for promoting the data portion to a deduplicated data cache. The criteria can include a condition that the data portion is a duplicate of content stored at multiple logical addresses, and can include a condition that the data portion has a reference count that is at least a minimum threshold where the reference count denotes a number of logical addresses at which the data portion is stored. Responsive to determining the data portion meets the criteria, the data portion can be stored in the deduplicated data cache.

19 Claims, 22 Drawing Sheets

(56) References Cited

U.S. PATENT DOCUMENTS

| | | | | |
|---|---|---|---|---|
| 11,573,928 | B2* | 2/2023 | Kucherov | G06F 11/076 |
| 2011/0029497 | A1* | 2/2011 | Benhase | G06F 3/0608 |
| | | | | 707/698 |
| 2013/0198459 | A1* | 8/2013 | Joshi | G06F 12/0871 |
| | | | | 711/133 |
| 2013/0297569 | A1* | 11/2013 | Hyde, II | G06F 12/0833 |
| | | | | 707/E17.005 |
| 2014/0258370 | A1* | 9/2014 | Bares | G06F 11/1453 |
| | | | | 709/203 |
| 2020/0042219 | A1* | 2/2020 | Wang | G06F 3/0683 |
| 2020/0241778 | A1* | 7/2020 | Bassov | G06F 12/0862 |
| 2020/0349088 | A1* | 11/2020 | Wang | G06F 3/0673 |

OTHER PUBLICATIONS

Mao et al. "SAR: SSD Assisted Restore Optimization for Deduplication-based Storage Systems in the Cloud." 2012. IEEE. NAS 2012. pp. 328-337.*

Wang et al. "Austere Flash Caching with Deduplication and Compression." Jul. 2020. USENIX. ATC 2020. pp. 713-726.*

Tan et al. "Improving the Performance of Deduplication-Based Storage Cache via Content-Driven Cache Management Methods." Jan. 2021. IEEE. IEEE Transactions of Parallel and Distributed Systems. vol. 32. pp. 214-228.*

* cited by examiner

CACHING TECHNIQUES USING A DATA DEDUPLICATION CACHE AND A DATA CACHE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O (input/output) operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system and a non-transitory computer readable medium comprising: receiving a first I/O operation directed to a first logical address; and responsive to receiving the first I/O operation, servicing the first I/O operation, wherein servicing the first I/O operation includes: determining whether a first data portion stored at the first logical address meets criteria for promoting the first data portion to a deduplicated data cache, wherein the criteria includes a first condition that the first data portion is a duplicate of content stored at multiple logical addresses of a logical address space, and wherein the criteria includes a second condition that the first data portion has a reference count that is at least a minimum threshold and wherein the reference count denotes a number of logical addresses of the logical address space at which the first data portion is stored; and responsive to determining that the first data meets the criteria, storing the first data portion in the deduplicated data cache.

In at least one embodiment, the deduplicated data cache can include a plurality of entries, wherein each of the entries can include a unique data portion stored in the deduplicated data cache where the unique data portion of the entry is unique with respect to other data portions stored in the deduplicated data cache, and wherein a particular data portion stored in the deduplicated data cache can be accessed using a key that maps to one of the plurality of entries including the particular data portion. The key used to access the particular data portion can be a reference to first metadata of mapping information. The first metadata can be used to access a physical storage location of a data block storing the particular data portion, and wherein the mapping information can be used to map the first logical address to the physical storage location. The key can be a first address of a first entry of a structure of the mapping information, wherein the first entry can include a second address denoting the physical storage location of the data block storing the particular data portion.

In at least one embodiment, the deduplicated data cache can include a plurality of data portions stored in a plurality of entries of the deduplicated data cache, wherein the plurality of entries and the plurality of data portions can be accessed using a plurality of keys associated with the plurality of entries. Each of the plurality of data portions stored in the deduplicated data cache can be a single unique instance so that the deduplicated data cache does not include any duplicate data portions. Each of the plurality of data portions stored in the deduplicated data cache can be stored in an uncompressed form.

In at least one embodiment, the first I/O operation can be a read I/O operation that reads the first data portion stored at the first logical address. A data cache can cache data portions stored at corresponding logical addresses. Servicing the first I/O operation can include: determining that the data cache does not include an entry for data stored at the first logical address thereby resulting in a read cache miss with respect to the data cache; reading mapping information for the first logical address to obtain first metadata of the mapping information, wherein the mapping information maps the first logical address to a first data block storing the first data portion, and wherein the first metadata is a reference used to access the first data block and retrieve the first data portion stored at the first data block; determining, using the first metadata as a first key for the first data portion, that the first data portion is not stored in the deduplicated data cache; reading, using the first metadata, the first data portion from the first data block, wherein said storing is performed after said reading, and wherein said storing stores the first data portion read from the first data block by said reading; and returning the first data portion in response to the first read I/O operation.

In at least one embodiment, the first data portion can be stored in a compressed form at the first data block, wherein said reading can include decompressing the first data portion from the compressed form to an uncompressed form, and wherein said storing can store the uncompressed form of the first data portion in the deduplicated data cache. Processing can include: receiving a second read I/O operation directed to a second logical address, wherein the second read I/O operation is received after said servicing the first I/O operation has completed; determining that the data cache does not include an entry for data stored at the second logical address thereby resulting in a read cache miss with respect to the data cache; reading second mapping information for the second logical address to obtain the first metadata of the second mapping information, wherein the second mapping information maps the second logical address to the first data block storing the first data portion, and wherein the first metadata is a reference used to access the first data block and retrieve the first data portion stored at the first data block;

determining, using the first metadata as the first key for the first data portion, that the first data portion is stored in the deduplicated data cache; reading, using the first metadata, the first data portion from the deduplicated data cache; and returning the first data portion in response to the second read I/O operation.

In at least one embodiment, the first I/O operation can be a write I/O operation that writes the first data portion stored at the first logical address. Servicing the first I/O operation can include performing data deduplication processing which can further comprise: determining that the first data portion is a duplicate of an existing unique copy of the first data portion stored at a first storage location on non-volatile storage; incrementing the reference count associated with the existing unique copy of the first data portion stored at the first storage location; and generating mapping information that maps the first logical address to the first storage location at which the existing unique copy of the first data portion is stored on the non-volatile storage.

In at least one embodiment, the deduplicated data cache can include a plurality of data portions of a plurality of tiers, wherein each of the plurality of tiers denotes a different frequency of access. The plurality of tiers can include a first tier denoting a lowest or minimum frequency of access with respect to the plurality of tiers. Processing can include selecting one or more data portions of the first tier for eviction from the deduplicated data cache. The one or more data portions selected by said selecting can be least recently used with respect to all data portions included in the first tier.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
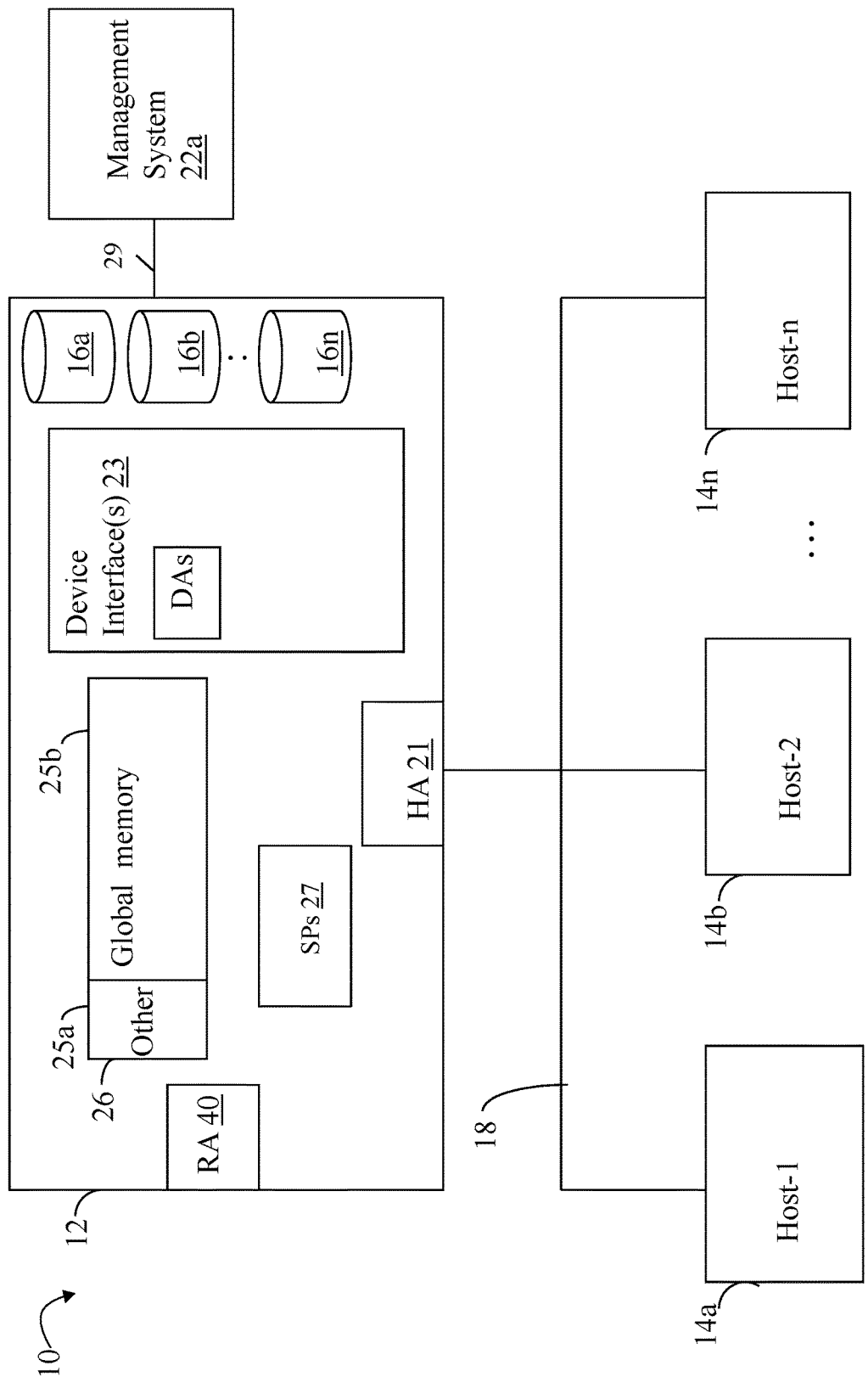
FIG. 1 is an example of components included in a system in accordance with the techniques of the present disclosure.

Data storage systems can service I/O operations from host or client systems, where the host or client systems have a virtualized environment and are executing virtual machines (VMs). One or more applications can further execute in the context of each of the VMs on the host systems. There can collectively be, for example, thousands of VMs executing on the hosts of a data center including multiple data storage systems.

In some implementations, the VMs executing on the hosts can be initially cloned from a standard or golden image which can be stored on a data storage system for use by the hosts or other clients. A typical data center can have thousands of such initially cloned VMs executing on the hosts where such VMs have associated images, or more generally data, stored in volumes or logical devices on the data storage system. In certain circumstances, one or more of the hosts can be restarted or rebooted, for example, due to a prior power outage or after completing scheduled system upgrades or maintenance activities. When one or more hosts having VM images and data stored on the data storage system are rebooted or restarted at the same time or within close time proximity, all the VMs of such hosts can be in the process of booting up at the same time causing what can be referred to as a boot storm. The boot storm can thus result in a large burst of activity and increased workload for the data storage system when the VMs are booting to access data which is stored on the data storage system and used in connection with booting the VMs. For example, a VM on a host can include an operating system and one or more applications, where code and other data of the operating system and applications can be stored on the LUNs of the data storage system. Such code and other data as stored on the data storage system can be accessed when booting the host and thus booting the VM on the host. Since each VM can be tens of GBs in size, the amount of data for the VM images and applications accessed by the host(s) in a short period of time during a boot storm can be quite large, whereby the cache of the data storage system can have insufficient capacity to store all the requested data. As a result, I/O requests, particularly read requests, from the host for VM related data during the boot storm can result in a large number of read cache misses (e.g., where the requested read data is not found in cache). Such read cache misses can be serviced by retrieving the requested read data from the physical backend non-volatile storage devices or drives, and thus can, significantly degrade the system performance.

In order to overcome the above-noted problems, described in the present disclosure are techniques that include promotion of deduplicated data into the cache based on one or more criteria such as the reference count of the deduplicated data. In connection with the VM boot storm example use case discussed above in at least one embodiment, the VMs can be initially cloned from the same standard VM image instance. Since the VMs are cloned from the same standard image, each of the cloned VMs can generally be expected have a large amount of duplicate data in common with other cloned VMs. For example, each of the VMs can be cloned to include a copy of the same operating system instance (e.g., same operating system vendor and version), and include a copy of one or more of the same application instances (e.g., same application vendor, application type and version), where the operating system instance and application instances are included in the standard VM image instance stored on the data storage system. In at least one embodiment, data of each of the VM images (e.g., including code of an operating system, applications and possibly other data used by the applications) of the host can be deduplicated before such VM related data is stored on the backend non-volatile storage devices or drives of the data storage system. Subsequently rebooting the host can include issuing read requests to the data storage system for such VM related data previously stored on the data storage system.

In a log structured system in at least one embodiment of the present disclosure, mapping information including metadata can be used to map and convert a logical address of the host or user data (e.g., such as VM related data) to a corresponding storage location of the physical backend non-volatile storage devices or drives. A logical address space of a logical layer can represent the flat address space exposed to the hosts, or more generally, users as volumes or logical devices. The logical address space can represent the user data or address space prior to deduplication. After deduplication in at least one embodiment, the mapping information can include metadata comprising a reference count that indicates the number of logical blocks of the logical address space that reference or point to the same unique data block (e.g., same content detected as duplicative by deduplication). Thus, the reference count can generally denote the number of logical addresses storing the same content of the same data block. When VMs are cloned from the same golden or standard image and deployed on one or more hosts, it can produce highly duplicative data with a reference count incremented for duplicates of the same content or the same data block.

In at least one embodiment in accordance with the techniques of the present disclosure, when VMs boot causing reads of the VM related data at the logical level (e.g., to a volume or logical device) from the data storage system, the read requests can be directed to the wide range of LBAs (logical block addresses) of the logical address space and can result in read cache misses at the logical level when referencing data stored at a logical address. As part of servicing a read received at the data storage system, a check for the reference count of the requested read data can be performed. If the reference count is greater than a threshold count, the requested read data can be promoted to the cache. Any subsequent read for any LBA that is mapped to a deduplicated block stored in the cache results in a read cache hit, where the subsequent read can be serviced using the cached deduplicated data block rather than having to retrieve the requested read data from a backend non-volatile physical storage device or drive. The foregoing promotion of the deduplicated data block to cache which subsequently results in the read cache hit improves performance with reduced latency by servicing the subsequent read using cached data, where the cached data is decompressed or uncompressed. In contrast to a read hit in at least one embodiment, a read cache miss can result increased latency since servicing the read can include reading the compressed form of the requested read data from the backend non-volatile physical storage device, decompressing the read data, storing the decompressed read data in the cache, and then returning the decompressed read data.

In at least one embodiment, a deduplicated data cache can be used to store cached deduplicated data blocks promoted to the deduplicated data cache based on a reference count associated with each such deduplicated data block. Generally, the minimum threshold reference count can be one of one or more criteria or properties that must be met in order for data or content to be promoted and stored in the deduplicated data cache. As noted above, the reference count can denote the number of different logical addresses at which the associated data block is stored, and where deduplication processing has detected the duplicate copies of the same data block at such different logical addresses. In at least one embodiment, the deduplicated data cache can be maintained as a separate cache from a data cache which can cache data that is organized, indexed and accessed based on logical addresses. The data cache and the deduplicated data cache can have separate and independent caching policies for management. For example, data can be promoted to the deduplicated data cache in accordance with criteria including the reference count associated with a data block where the reference count is at least a specified threshold value. In contrast, the data cache may be used to cache data stored at a particular logical address, where the data is read from the backend non-volatile storage devices responsive to a read cache miss for a read I/O operation requesting the data stored at the particular logical address.

In at least one embodiment, the deduplicated data cache can be characterized by particular properties and meeting certain criteria for promotion. In at least one embodiment, each data block stored in the deduplicated data cache has been detected by deduplication processing as being referenced by multiple logical addresses. In at least one embodiment, each data block stored in the deduplicated data cache has an associated reference count denoting the number of logical addresses that reference the data block. In at least one embodiment, each data block stored in the deduplicated data cache has an associated reference count that is at least a specified threshold minimum. In at least one embodiment, each data block stored in the deduplicated data cache is a unique data block instance such that the deduplicated data cache does not include more than one copy or instance of each data block even though each such data block instance is stored at multiple logical addresses. In at least one embodiment for further optimization of cache storage, each data block instance can be stored exclusively either in the data cache or the deduplicated data cache, but not both. In this manner in at least one embodiment, a deduplicated data block having an associated reference count exceeding the minimum threshold may not be promoted to the deduplicated data cache if the data block is already stored in the data cache. The data block can be stored in the data cache based on the data cache's policies and rules independently of the policies and rules for promotion into the deduplicated data cache.

In at least one embodiment, the VM related data that can be duplicated among the VMs can include, for example, VM image data such as code of the VM operating system and applications executing in the VM on the host. The VM related data that can be deduplicated can also include other data, such as data files or portions of data files or content used by the applications. The VM related data that can be deduplicated can also include the mapping information or metadata used to map logical to physical addresses.

The techniques of the present disclosure can be used in connection with the particular use case of a VM boot storm discussed above. More generally, the techniques of the present disclosure can be used in connection with any suitable environment and usage scenario to generally promote any suitable deduplicated data to the cache, such as the deduplicated data cache, based on the reference count associated with the deduplicated data.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14*a*-14*n* through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

A data storage system can perform different data services such as data reduction services and operations. Data reduction services and operations, such as deduplication and compression, attempt to reduce the amount of physical storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique can be used in an embodiment in accordance with the techniques of the present disclosure. In at least one embodiment in accordance with the techniques of the present disclosure, data deduplication processing performed can include partitioning received data into blocks or chunks and, for each block or chunk, determining a digest or hash value for the chunk by performing a computation using a hashing algorithm such as based on the SHA-256 cryptographic hashing algorithm known in the art. Data deduplication generally refers to removing redundant or duplicate data portions. Data deduplication techniques can include looking for duplicate data blocks whereby only a single instance of the data block is retained (stored on physical storage) and where pointers or references can be used in connection with duplicate or redundant copies (which reference or identify the single stored instance of the data block).

Figure 2A:
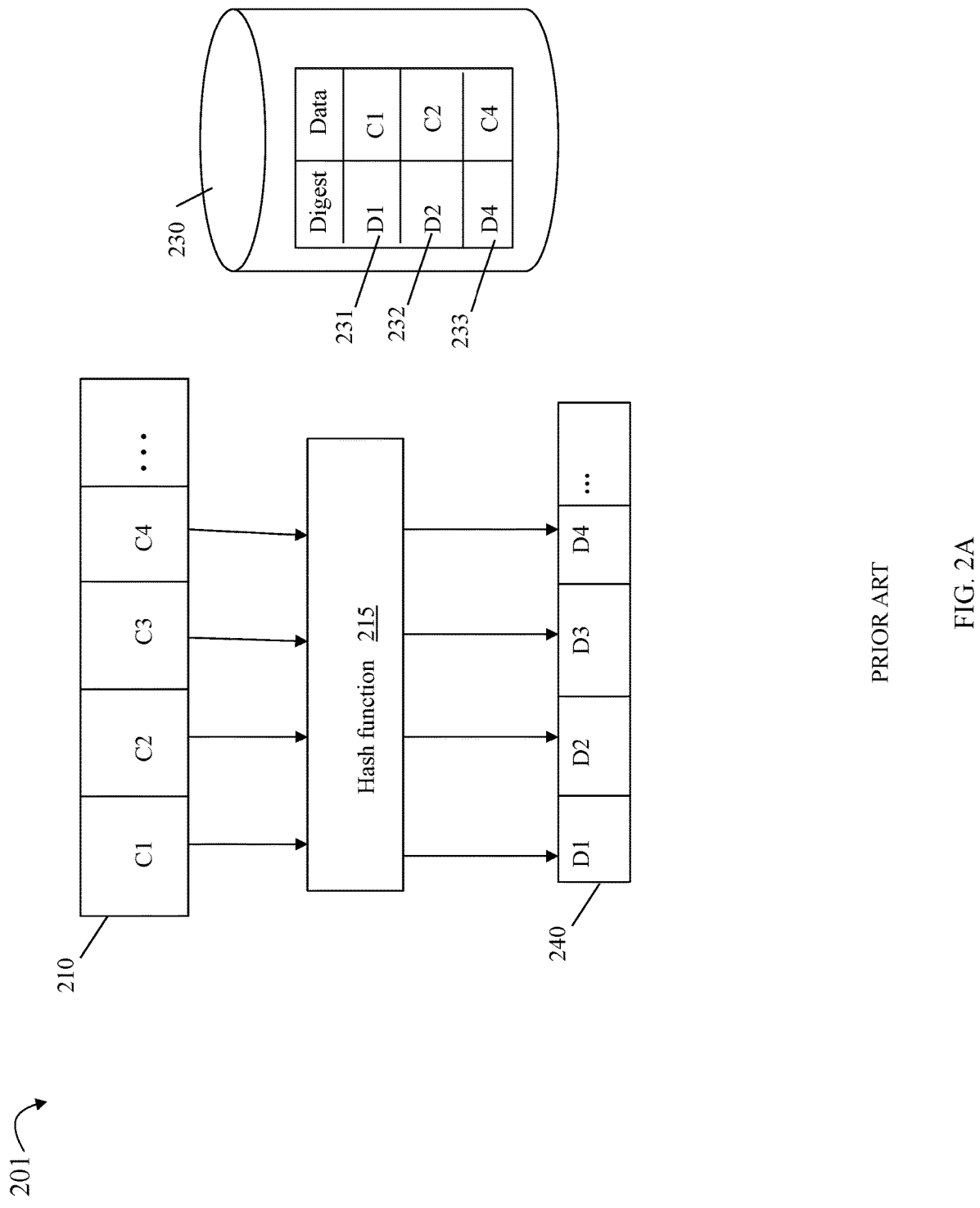
FIG. 2A is an example illustrating data deduplication performed in an embodiment in accordance with the techniques herein.

Referring to the FIG. 2A, shown is an example 201 illustrating processing that can be performed in connection with data deduplication in an embodiment in accordance with the techniques herein. The element 210 denotes the original data being written or stored on back-end non-volatile storage. The original data can be partitioned into multiple data blocks C1, C2, C3, C4 and the like. In at least one embodiment and for purposes of illustration, the data blocks can all be the same size where the size can vary with embodiment. Each block is provided as an input to hash function 215. As noted above, in at least one embodiment, the hash function 215 can be the SHA-256 hashing algorithm, or more generally, any suitable cryptographic, or non-cryptographic hashing function known in the art. For each block of 210, the hash function 215 performs processing and generates, as an output, a hash value, hash or digest derived from the block 210. The element 240 includes hashes D1, D2, D3, D4, and the like, where a corresponding different one of the hashes DN is generated for each one of the blocks CN (where "N" is an integer denoting the block and associated hash value generated for that block). For example, D1 is the hash generated for C1, D2 is the hash generated for C2, D3 is the hash generated for C3, and so on. Generally, a hash function 215 is selected which has an acceptably low probability of a "hash collision" of generating the same digest or hash value for two different blocks. The strength of the hash function 215 can be measured by the unlikelihood of a collision occurring where two different input blocks of data produce the same hash. The strength increases with the bit length of the hash value, hash or digest. Thus, if two blocks, such as C1 and C3, have the same hashes whereby D1=D3, then blocks C1 and C3 match (e.g., are identical matching data blocks). If two blocks, such as C1 and C4, have different hashes whereby D1 does not equal D4, then blocks C1 and C4 do not match (e.g., are different or non-matching data blocks). In cases where two matching or identical blocks have the same hash, only a single copy of the data block is stored on backend non-volatile physical storage of the data storage system. The single stored instance of the data block can be referenced using a pointer, handle, the hash of the block, and the like.

The element 230 of the FIG. 2A denotes the data store, such as a data base (DB) used to store data blocks. In this example, as noted above, assume blocks C1 and C3 are the same with remaining blocks C2 and C4 being unique. In at least one embodiment, the data store 230 can be organized and managed using a data structure, such as a hash table. In at least one embodiment, computed hashes, or portions thereof, can be used as an index into the hash table, where the single unique instances of data blocks can be stored (along with other metadata, such as a reference count discussed elsewhere herein, as may be needed for maintaining the table and also in accordance with the particular hash table management used in an embodiment). Hash tables are data structures known in the art. A hash table uses a hash function to compute an index into an array of buckets or slots, from which the desired data can be found. In this example, the block of data is mapped by hash function 215, and thus by the block's hash, to a particular entry in the table at which the block of data is stored. To further illustrate, the hash function 215 can be used to generate a hash value, hash or digest for a particular data block. The hash is then further mapped (e.g., such as by another mathematical function, using particular portions of the hash, and the like) to a particular index or entry of the hash table. The particular mapping used to map the hash to a corresponding table entry varies, for example, with the hash and the size of hash table.

When storing a new data block, such as C1, its hash can be mapped to a particular hash table entry 231 whereby if the table entry is null/empty, or otherwise does not already include a data block matching C1, then C1 is stored in the table entry along with its associated hash D1 (this is the first time block C1 is recorded in the data store 230). Otherwise, if there is already an existing entry in the table including a data block matching C1, it indicates that the new data block is a duplicate of an existing block. In this example as noted above, processing is performed for C1, C2, and C4 respectively, where entries 231, 232, and 233 are added since there are no existing matching entries in the hash table. When processing block C3, as noted above, C3 has a hash D3 matching D1 whereby C3 (and thus D3) maps to entry 231 of the hash table already including a matching block C1 (so no additional data block is added to 230 for C3 since C3 is determined as a duplicate of C1). In connection with representing a particular file or other storage entity including multiple duplicate occurrences of a particular block such as C3, the single instance or copy of the data can be stored in 230. Additionally, a handle or reference, such as identifying the hash table entry 231, its hash, and the like, can be used to reference the single instance or copy of the data storage in 230. When reconstructing or restoring data to its original form, the handle or reference into the hash table for block C3 can be used to obtain the actual block C3 of data from 230.

In some embodiments, the hash function used to generate digests or hash values for different data blocks can possibly generate the same digest or hash value for two different data blocks. In this case in at least one embodiment when determining whether a candidate data block matches an existing data block already stored in the data store and having an existing entry in the hash table, processing can include also comparing the content of the existing and candidate data blocks (e.g., bit for bit comparison) to determine if the two data blocks having the same digest or hash value match. For example, deduplication processing can include calculating a hash value HV1 for a new candidate block and comparing HV1 to other digests or hash values in the hash table for existing data blocks already stored in the data store 230. If HV1 matches an existing HV of an entry of the hash table for an existing data block stored in the data store 230, processing can also include then comparing the contents of the candidate data block and the existing data block with the existing HV in the hash table entry. The candidate data block can be determined as a duplicate of the existing data block if both the existing data block's HV and the HV1 of the candidate block match, and also if the candidate data block matches the existing data block.

In at least one embodiment, an entry of the hash table associated with a data block stored in the data store 230 can have associated metadata including a reference count. The reference count can denote the number of references or times that the same associated data block has been detected as being stored in different logical addresses. Thus each time a candidate block matches an existing data block stored in the data store 230 where the existing data block has a corresponding entry in the hash table used to access the existing data block stored in the data store 230, the corresponding entry can be further associated with metadata that includes a reference count that is incremented each time a candidate block matches the existing data block. In a similar manner, if a particular occurrence or reference to the existing data block is removed, deleted or otherwise eliminated (e.g., if content stored at a particular logical location of a file or other storage object is deleted or modified), the reference count can be decremented to accurately reflect the current number of references to the existing data block.

Figure 2B:
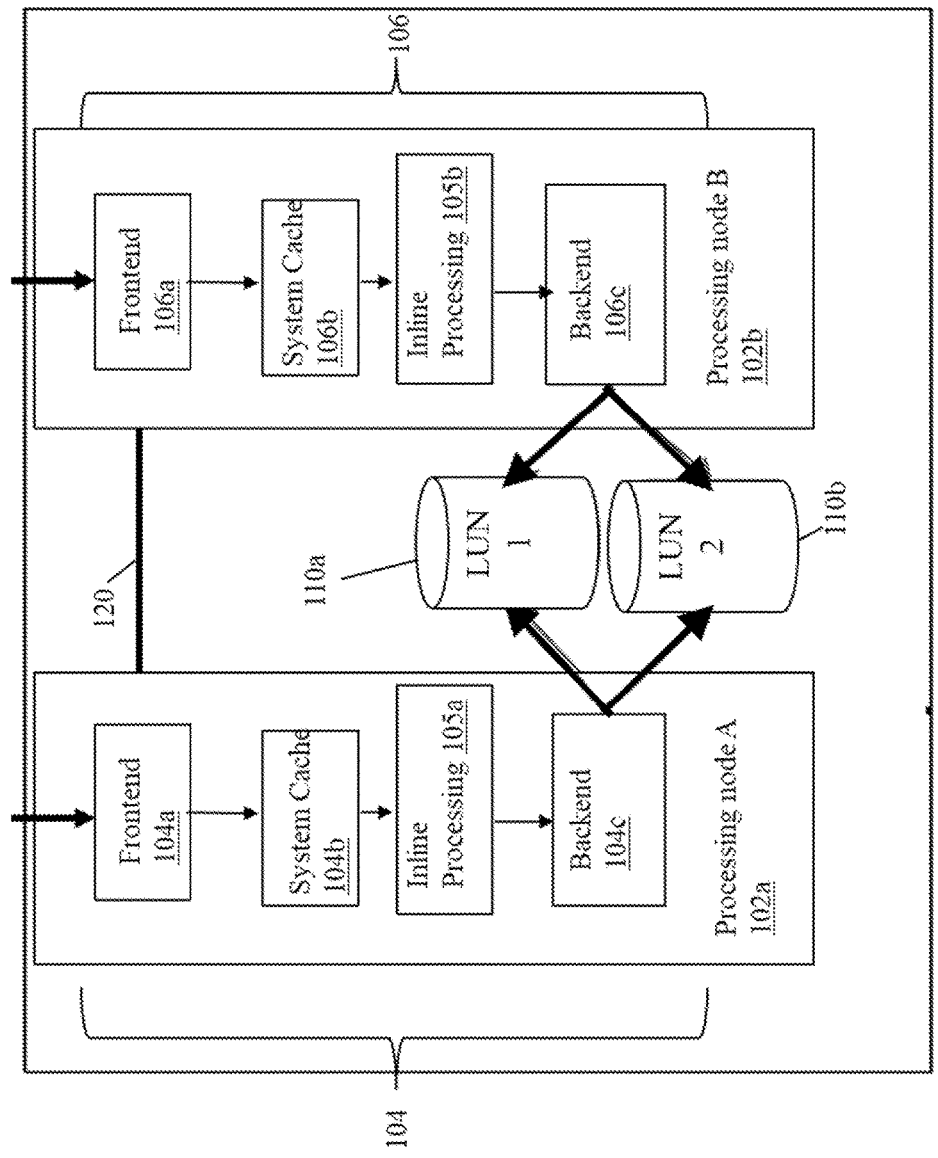
FIG. 2B is an example illustrating the I/O path or data path in connection with processing data in an embodiment in accordance with the techniques of the present disclosure.

With reference to the FIG. 2B, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 100, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache (e.g., cache hit or read cache hit), the read data block is retrieved from the system cache 104b and returned to the host. Otherwise, if the requested read data block is not in the system cache 104b (e.g., cache miss or read cache miss) but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2B is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2B. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2B, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2B, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
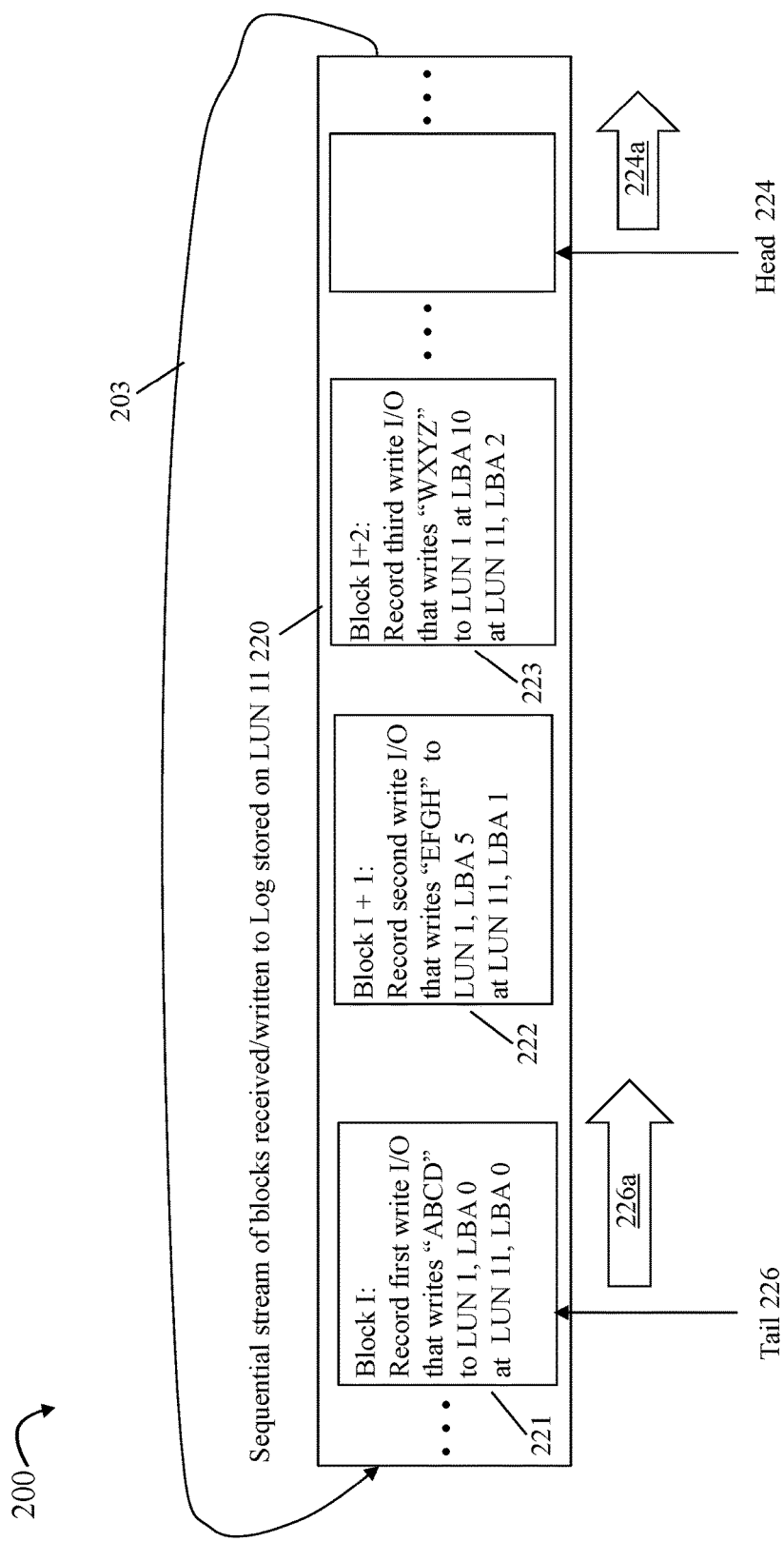
FIGS. 3, 4, 5 and 6 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
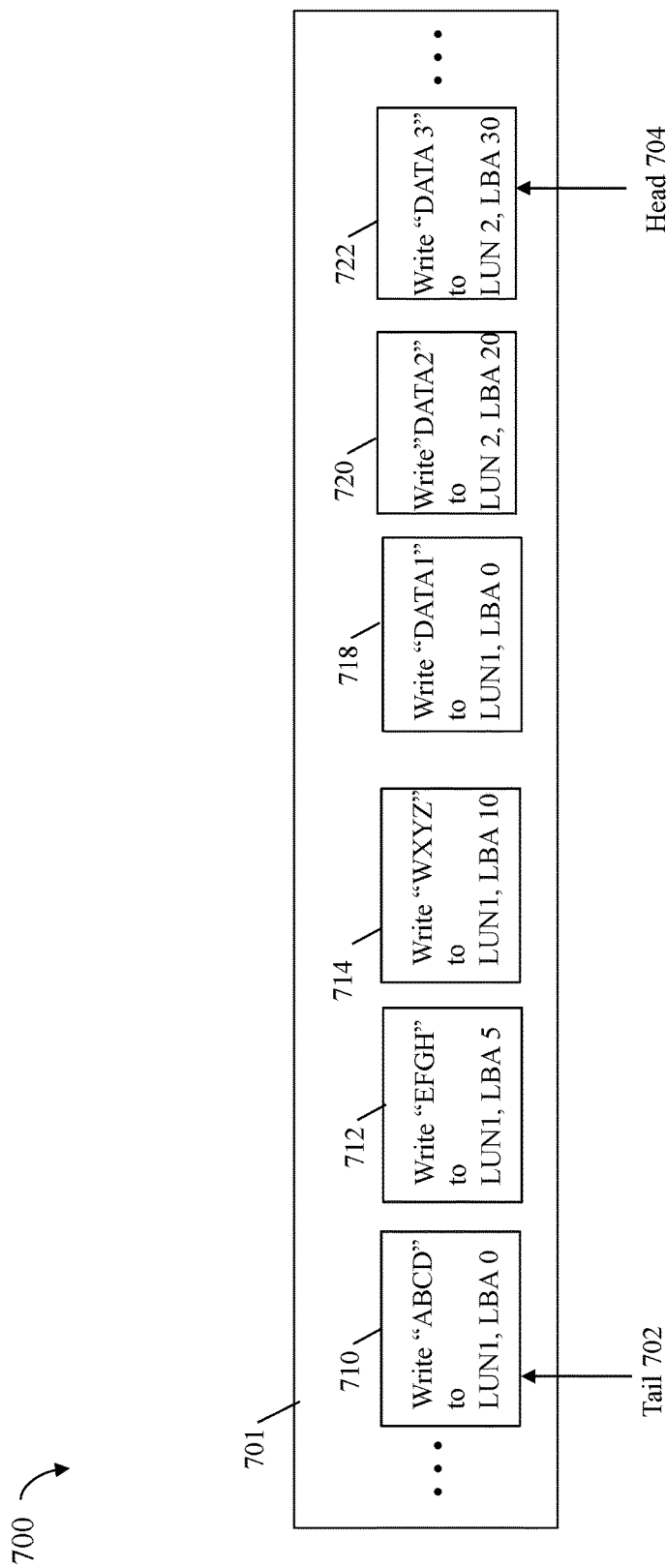

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
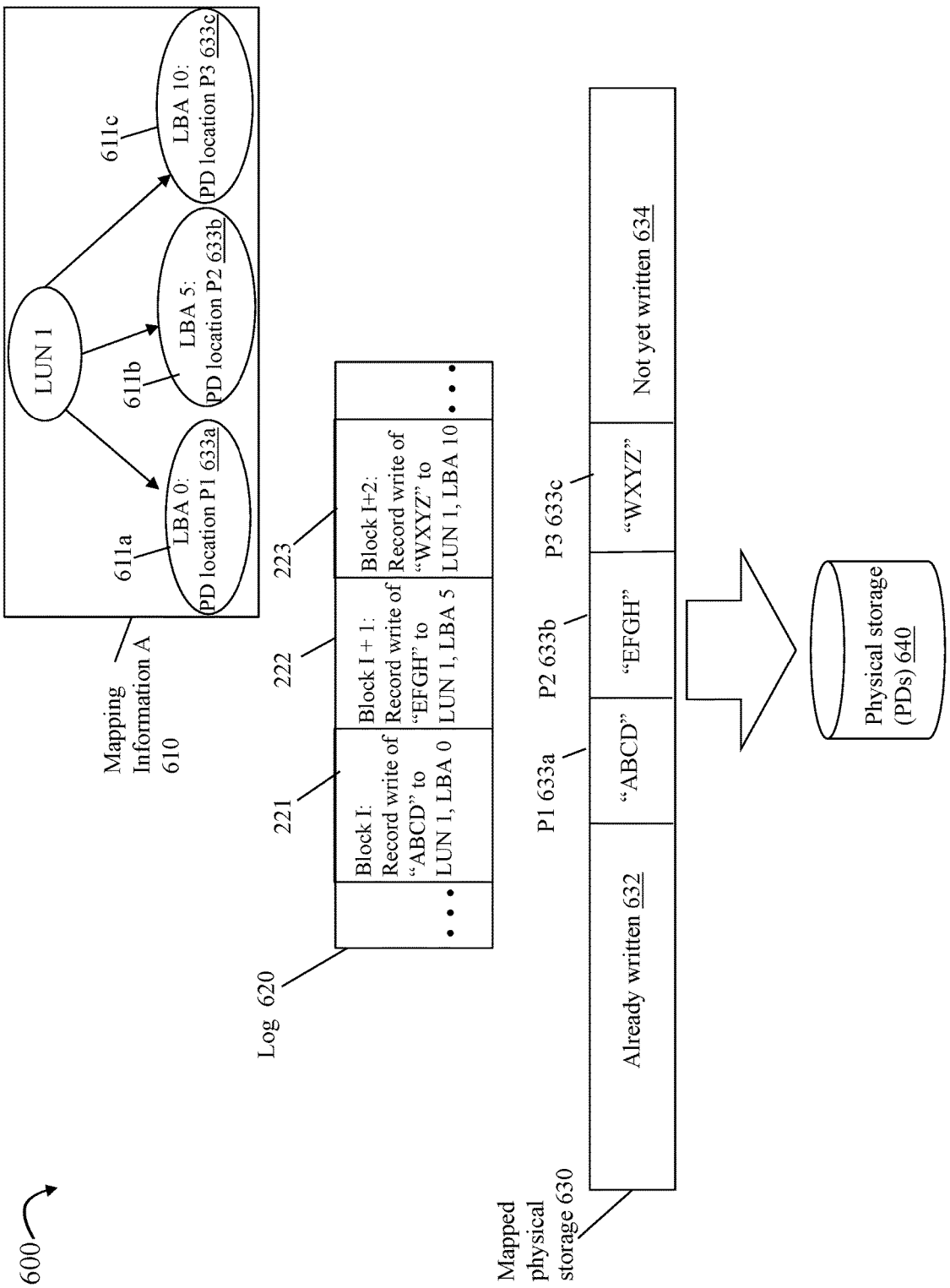

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs.

Figure 6:
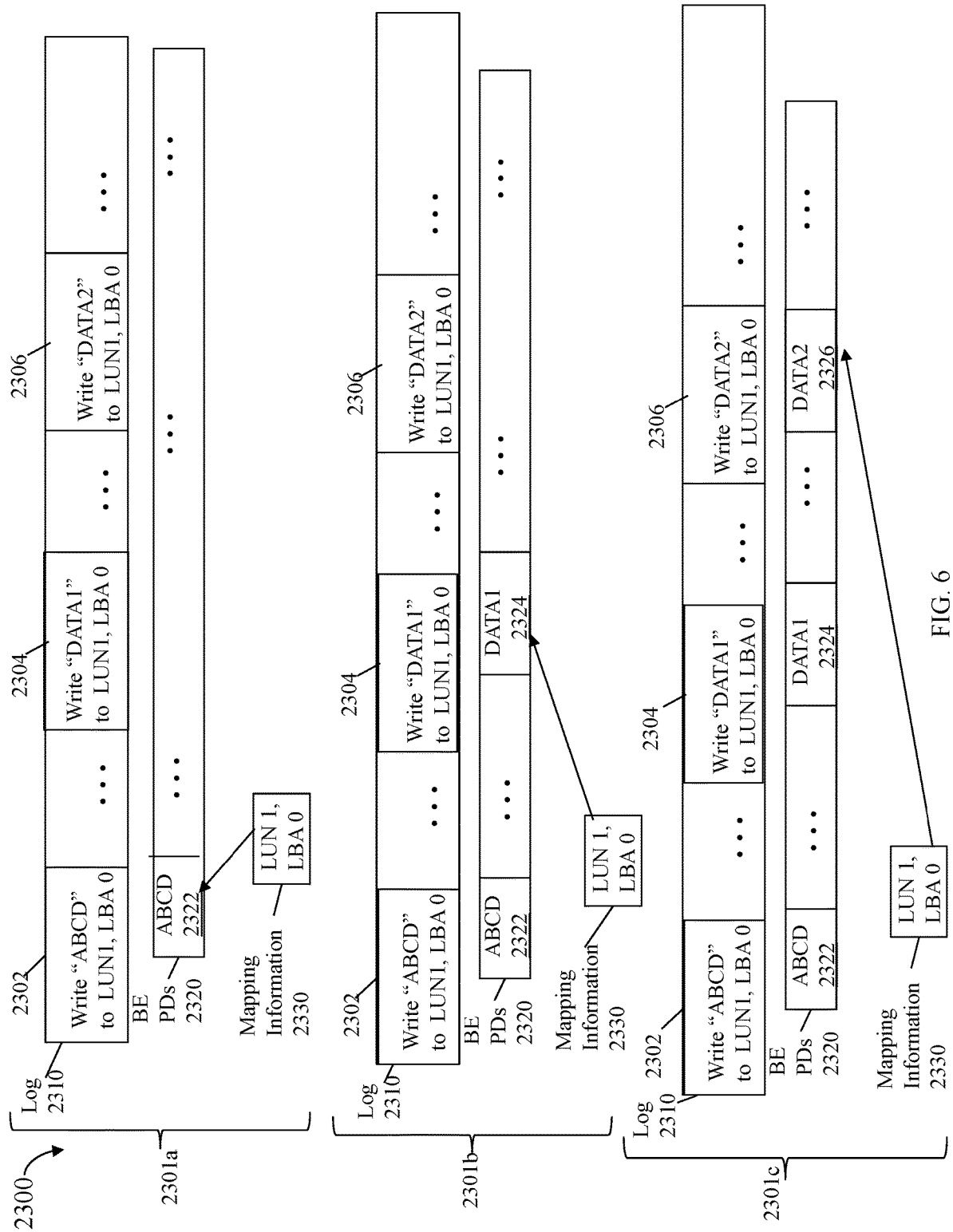

For example with reference to FIG. 6, the element 2301a can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 320. The element 2301b denotes the state of the log file 2310, BE PDs 2320 and mapping information 2330 at the second point in time T2 after processing the record 2304 for a second write of "DATA1" to the logical address LUN A, LBA 0. The data written "DATA1" by the recorded write of 2304 can be stored at the BE PD location 2324. Thus, flushing the log record 2304 results in storing the write data "DATA1" to the BE PD location 2324 and additionally updating the mapping information 2330 to reference the BE PD location 2324 denoting the physical location containing the data stored at the LUN 1, LBA 0 at the time T2. Additionally, the PD location 2322 can be invalidated since it no longer contains valid current data for the logical address LUN 1, LBA 0, whereby the PD location 2322 can be available for reuse. After the log record 2304 is flushed from the log 2310, the record 2304 is available and can be subsequently reclaimed for reuse for logging other operations in the log 2310.

At a third point in time T3 subsequent to T2, the log record 2306 can be processed and flushed to the BE PDs 2320. The element 2301c denotes the state of the log file 2310, BE PDs 2320 and mapping information 2330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

Consistent with discussion above, the mapping information (sometimes referred to as a mapping structure, metadata structure or metadata) can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 7A:
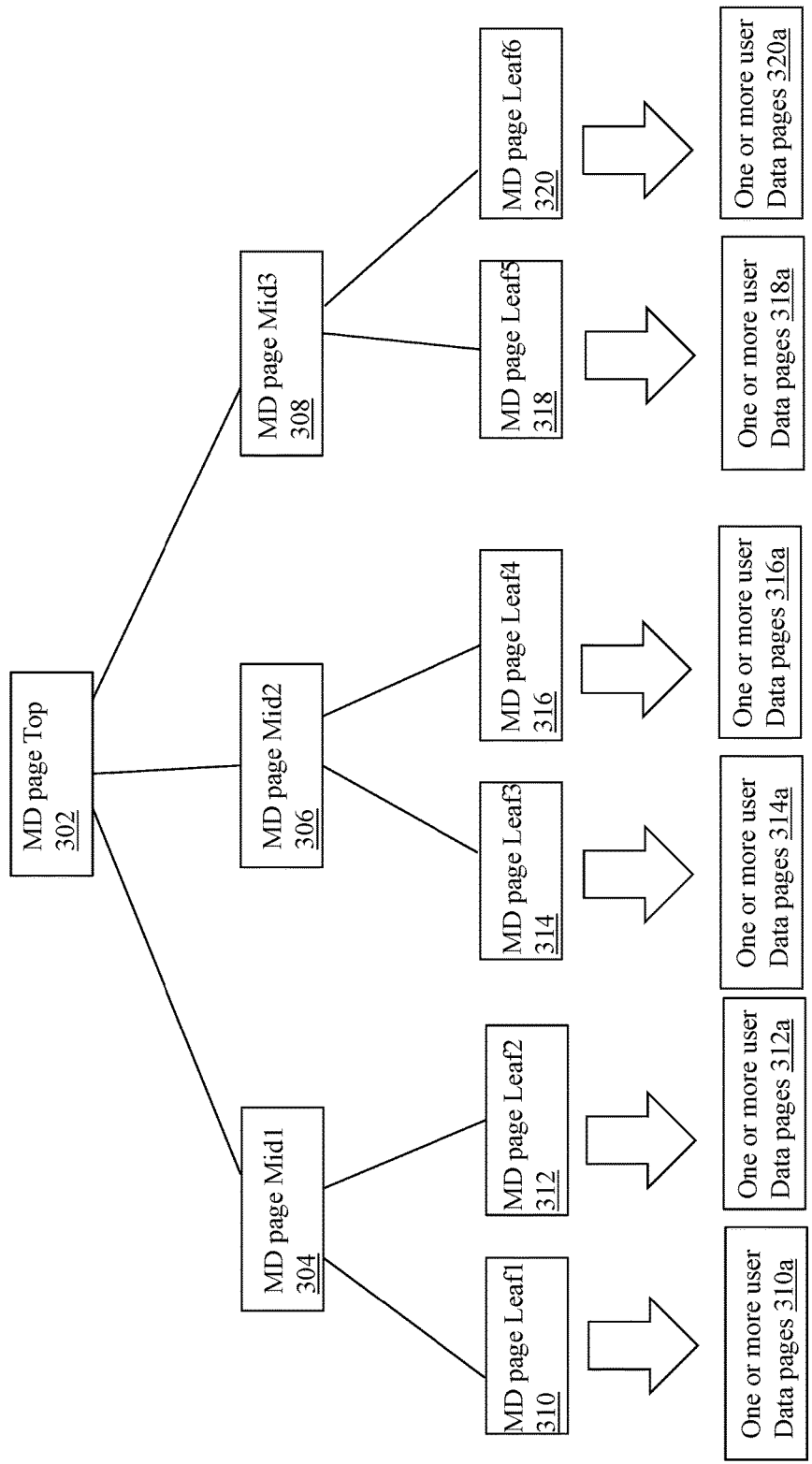
FIGS. 7A-7D are examples of mapping information in the form of a hierarchical metadata structure that can be used in an embodiment in accordance with the techniques of the present disclosure.

In at least one embodiment, the mapping information or structure for a LUN, such as LUN 1 described above in connection with FIGS. 3, 4, 5 and 6, can be in the form of a tree having a plurality of levels of MD pages. More generally, the mapping structure can be in the form of any ordered list or hierarchical structure. In at least one embodiment, the mapping structure for a LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 7A as including only 3 levels where each node in the tree can have at most 3 child nodes. Generally, the techniques herein can be used with any layered or hierarchical structure of MD pages.

The mapping information, such as denoted by the element 610 of FIG. 5 and the element 2330 of FIG. 6, in at least one embodiment can be a mapping structure that is a tree of MD pages as described in more detail in connection with FIGS. 7A-7D below.

Referring to FIG. 7A, shown is an example 300 of a tree of MD pages that can be used in an embodiment in accordance with the techniques herein. The example 300 includes a tree of MD pages denoting the mapping structure of mapping information as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 7A, the data pages 310a, 312a, 314a, 316a, 318a and 320 each include user data stored on particular logical addresses of the LUN A's logical address space. It can be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 7B:
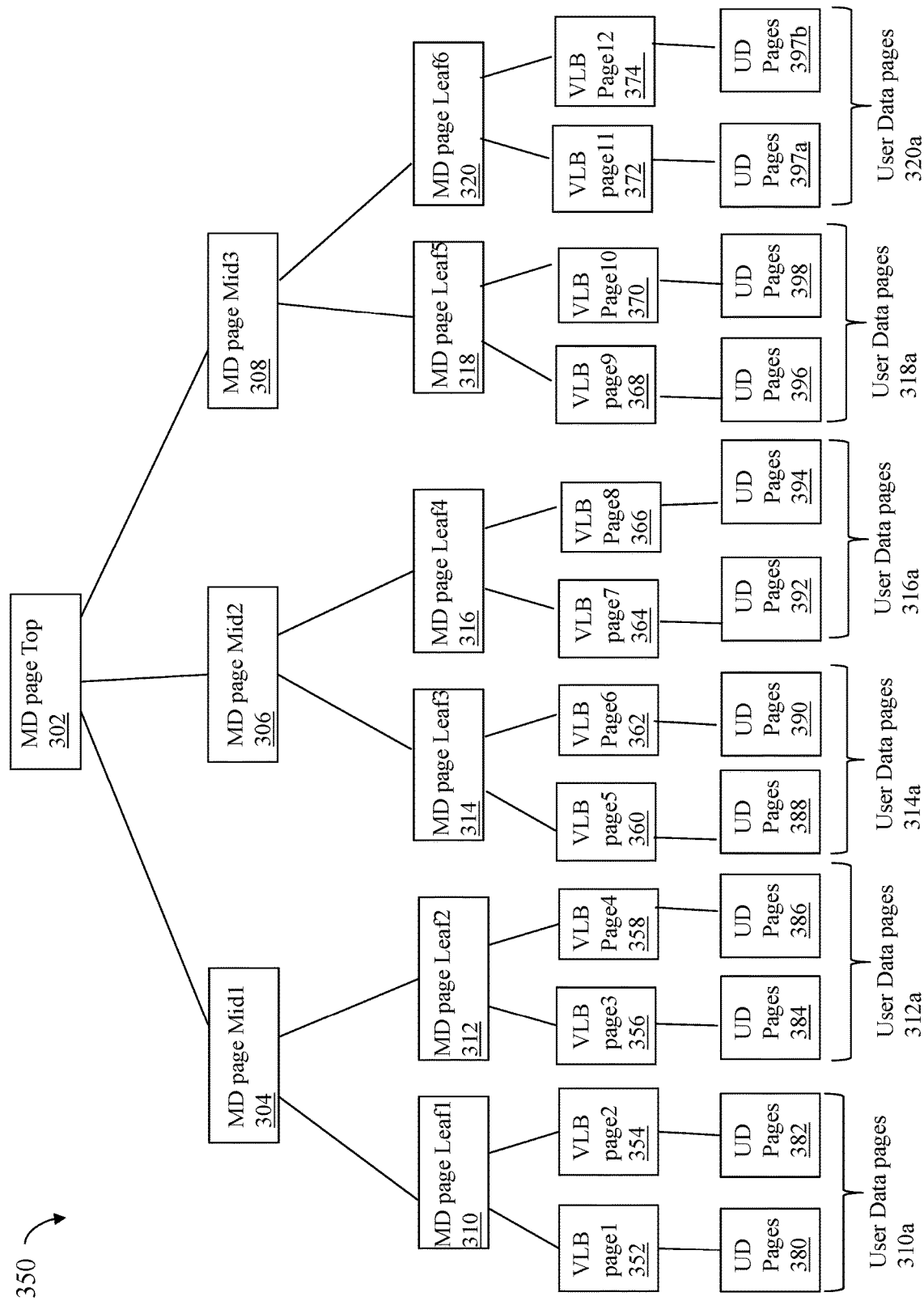

Referring to FIG. 7B, shown is a more detailed version of a hierarchical structure used as the mapping structure or mapping information that can be used in an embodiment in accordance with the techniques of the present disclosure. The structure 350 is similar to the structure 300 as described and illustrated in FIG. 7A with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 7A. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 7A including data for LBAs 0-511. The UD pages 384 and 386 denote two portions of UD pages corresponding to UD pages 312a of FIG. 7A including data for LBAs 512-1023. The UD pages 388 and 390 denote two portions of UD pages corresponding to UD pages 314a of FIG. 7A including data for LBAs 1024-1535. The UD pages 392 and 394 denote two portions of UD pages corresponding to UD pages 316a of FIG. 7A including data for LBAs 1536-2047. The UD pages 396 and 398 denote two portions of UD pages corresponding to UD pages 318a of FIG. 7A including data for LBAs 2048-2559. The UD pages 397a and 397b denote two portions of UD pages corresponding to UD pages 320a of FIG. 7A including data for LBAs 2560-3072.

In furtherance of the example above regarding UD page X and now with reference to FIG. 7B, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 7C:
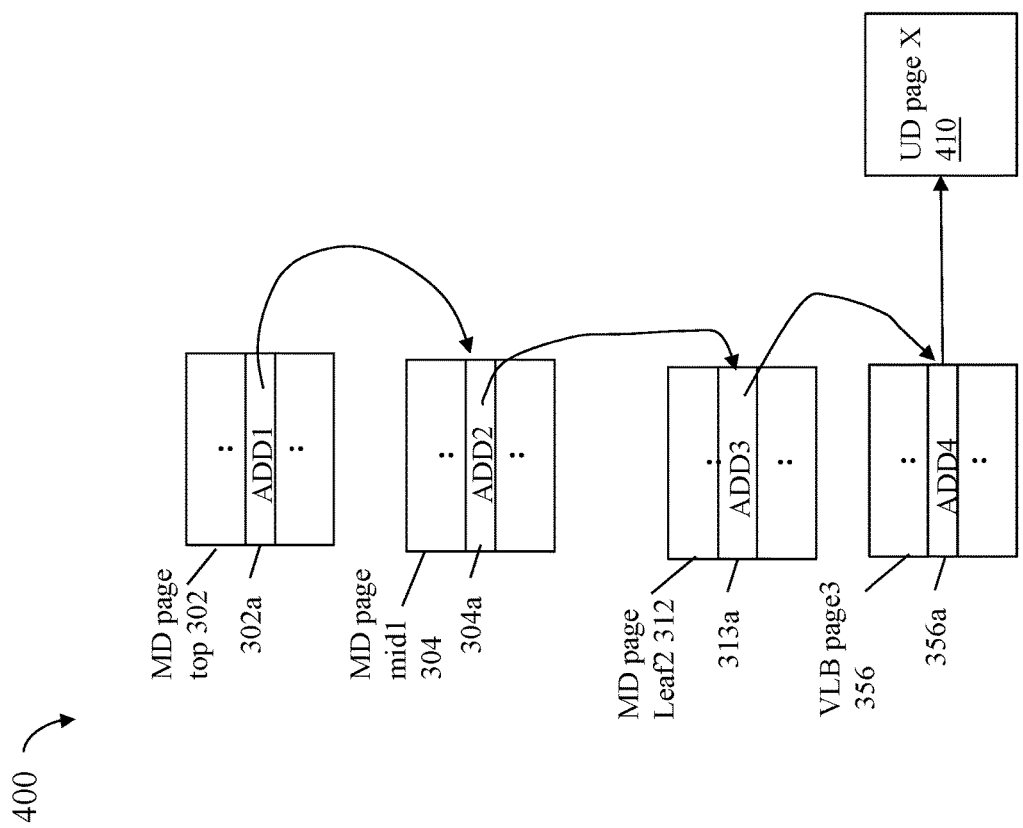

Referring to FIG. 7C, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 313a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 313a of the MD page leaf 2 312. If the MD page 312 is not already in cache, the on-disk copy of the MD page 312 on a PD can be read to obtain the content of location 313a. The location 313a of the MD page leaf2 312 can be accessed and read to obtain the address or pointer ADD3 from location 313a. The address or pointer ADD3 can then be used to identify a particular entry of a VLB page, such as the entry 356a of the VLB page 3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 7C includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 7D:
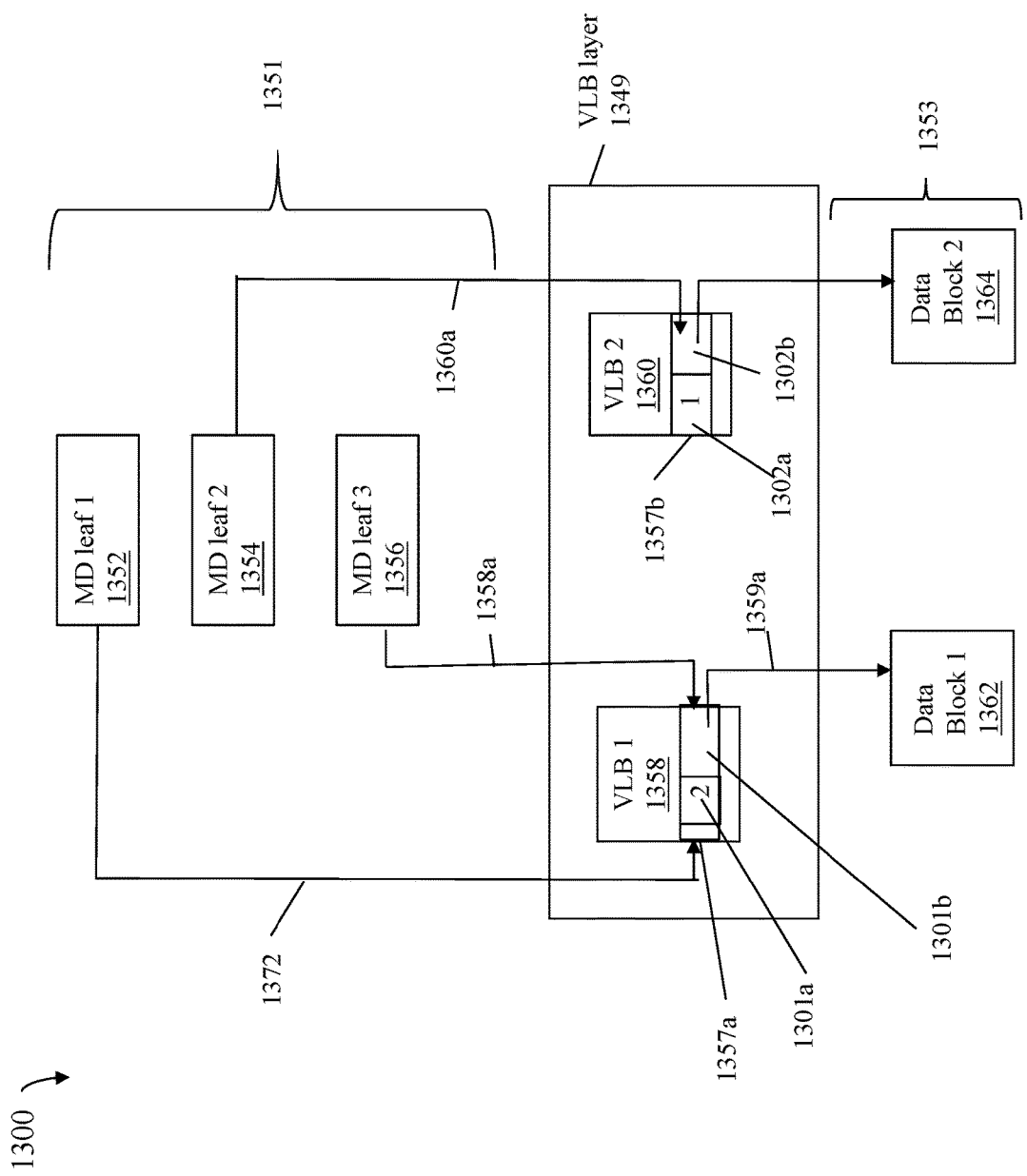

Referring to FIG. 7D, shown is an example illustrating in more detail a particular embodiment in which a VLB layer of multiple VLBs is the intervening layer between the MD leaf nodes of the mapping structure or mapping information and the data blocks. The elements 1352, 1354 and 1356 can denote 3 MD leaf nodes included in a MD leaf layer of a MD mapping structure such as described herein (e.g., in FIGS. 7A-7C). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358.

The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

In at least one embodiment, the reference count 1301a can be initialized to 0 and used when the associated data block 1362 becomes a candidate for deduplication. As long as the data storage system includes at least one instance of, and thus at least one reference, to the data block 1362, the reference count 1301a will be non-zero. The reference count 1301a can become zero when all instances of, or references to, the data block 1362 are deleted. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

In at least one embodiment, the reference count 1302a can be initialized to 0 and used when the associated data block 1364 becomes a candidate for deduplication. As long as the data storage system includes at least one instance of, and thus at least one reference, to the data block 1364, the reference count 1302a will be non-zero. The reference count 1302a becomes zero when all instances of, or references to, the data block 1364 are deleted. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 7A-7D.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 7A-7D. In at least one embodiment, the MD or mapping information used in connection with stored user data can be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 7A-7D.

As noted above, a data storage system can service I/Os from host or client systems, where the host or client systems have a virtualized environment and are executing virtual machines (VMs). One or more applications can further execute in the context of each of the VMs on the host systems. There can collectively be, for example, thousands of VMs executing on the hosts of a data center including multiple data storage systems.

In some implementations, the VMs executing on the hosts can be initially cloned from a standard or golden image which can be stored on a data storage system for use by the hosts or other clients. A typical data center can have thousands of such initially cloned VMs executing on the hosts where such VMs have associated images, or more generally data, stored in volumes or logical devices on the data storage system. In certain circumstances, one or more of the hosts can be restarted or rebooted, for example, due to a prior power outage or after completing scheduled system. When one or more hosts having VM images and data stored on the data storage system are rebooted or restarted at the same time or within close time proximity, all the VMs of such hosts can boot up at the same time causing what can be referred to as a boot storm. The boot storm can thus result in a large burst of activity and increased workload for the data storage system when the VMs are booting to access data which is stored on the data storage system and used in connection with booting the VMs. For example, a VM on a host can include an operating system and one or more applications, where code and other data of the operating system and applications can be stored on the LUNs of the data storage system. Such code and other data as stored on the data storage system can be accessed when booting the host and thus booting the VM on the host. Since each VM can be tens of GBs in size, the amount of data for the VM images and applications accessed by the host(s) in a short period of time during a boot storm can be quite large, whereby the cache of the data storage system can have insufficient capacity to store all the requested data. As a result, I/O requests from the host for VM related data during the boot storm can result in a large number of read cache misses (e.g., where the requested read data is not found in cache). Such read cache misses can be serviced by retrieving the requested read data from the physical backend non-volatile storage devices or drives, and thus can, significantly degrade the system performance.

In order to overcome the above-noted problems, described in the present disclosure are techniques that include promotion of data into the cache based on the reference count of deduplicated data. For example, the reference count can be stored in the mapping information of the MD structure as described in connection with FIGS. 7A-7D. In connection with the VM boot storm example use case discussed above in at least one embodiment, the VMs can be initially cloned from the same standard VM image instance. Since the VMs are cloned from the same standard image, each of the cloned VMs can have a large amount of duplicate data. For example, each of the VMs can be cloned to include a copy of the same operating system instance (e.g., same operating system vendor and version), and include a copy of one or more of the same application instances (e.g., same application vendor, application type and version), where the operating system instance and application instances are included in the standard VM image instance stored on the data storage system. In at least one embodiment, data of each of the VMs images (including applications and data used by the applications) of the host can be deduplicated before such VM related data is stored on the backend non-volatile storage devices or drives (e.g., PDs) of the data storage system.

One example of an LSS in at least one embodiment of the present disclosure is described above, for example, in connection with FIGS. 3, 4, 5 and 6. Additionally, the LSS can use the mapping information such as discussed above, for example, in connection with FIGS. 7A-7D to map and convert a logical address of the host or user data (e.g., such as a logical address of VM related data) to a corresponding storage location stored on the physical backend non-volatile storage devices or drives. The logical address can be, for example, a LUN (e.g., volume or logical device) and an LBA or logical offset on the LUN. The logical address can be included in an I/O request, such as a read or write I/O operation from a host or client of the data storage system. A logical address space of a logical layer can represent the flat address space exposed to the hosts, or more generally, users as volumes or logical devices. The logical address space can represent the user data or address space prior to deduplication. After deduplication in at least one embodiment, the mapping information can include metadata comprising a reference count (e.g., as in FIG. 7D) that indicates the number of logical blocks of the logical address space that reference or point to the same data block. Thus, the reference count can generally denote the number of logical addresses storing the same content of the same data block. When VMs are cloned from the same golden or standard image and deployed on one or more hosts, it can produce highly dedupable data with reference counts incremented for duplicate blocks.

When VMs boot causing reads of the VM related data at the logical level (e.g., to a volume or logical device) from the data storage system, the read requests can be directed to the wide range of LBAs (logical block addresses) of the logical address space and can result in read cache misses at the logical level when referencing data stored at a logical address. As part of servicing a read received at the data storage system, a check for the reference count of the requested read data can be performed. If the reference count is greater than a threshold count, the requested read data can be promoted to the cache. Any subsequent read for any LBA that is mapped to a deduplicated block stored in the cache results in a read cache hit, where the subsequent read can be serviced using the cached deduplicated data block rather than having to retrieve the requested read data from a backend non-volatile physical storage device or drive. The foregoing promotion of the deduplicated data block to cache which subsequently results in the read cache hit improves performance with reduced latency by servicing the subsequent read using cached data, where the cached data is decompressed or uncompressed. In contrast in at least one embodiment, a read cache miss can result increased latency since servicing the read can include reading the compressed form of the requested read data from the backend non-volatile physical storage device, decompressing the read data, storing the decompressed read data in the cache, and then returning the decompressed read data.

In at least one embodiment in accordance with the techniques of the present disclosure the data storage system can implement multiple caches each of which can logically be maintained separately in accordance with their own respective caching policies. In at least one embodiment, the data storage system caches or caching layers can include a metadata cache, a data cache, and a deduplicated data cache. The metadata cache can be used to cache metadata such as mapping information or location information used to map logical addresses to physical addresses in the BE PDs. The data cache can be a general data cache used to cache data in connection with servicing I/O operations. The data cache can cache data for access based on logical addresses so that if two logical addresses store the same data or content, the data cache can include two entries for the two logical addresses where each of the two entries include the same data or content. The deduplicated data cache can be used to cache only data having certain properties and meeting one or more specified criteria. For example, the criteria can include only storing data that has been deduplicated. Further the criteria can include only storing deduplicated data with an associated reference count above a specified minimum threshold.

In at least one embodiment, the VM related data that can be duplicated among the VMs can include, for example, VM image data such as code of the VM operating system and applications executing in the VM on the host. The VM related data that is deduplicated can also include other data, such as data files or portions of data files used by the applications. The VM related data that is deduplicated can also include the mapping information or metadata used to map logical to physical addresses.

The techniques of the present disclosure can be used in connection with the particular use case of a VM boot storm. More generally, the techniques of the present disclosure can be used in connection with any suitable environment and usage scenario to generally promote any suitable deduplicated data to the cache based on the reference count associated with the deduplicated data.

The foregoing and other aspects of the techniques of the present disclosure are described in more detail in the following paragraphs.

Figure 8:
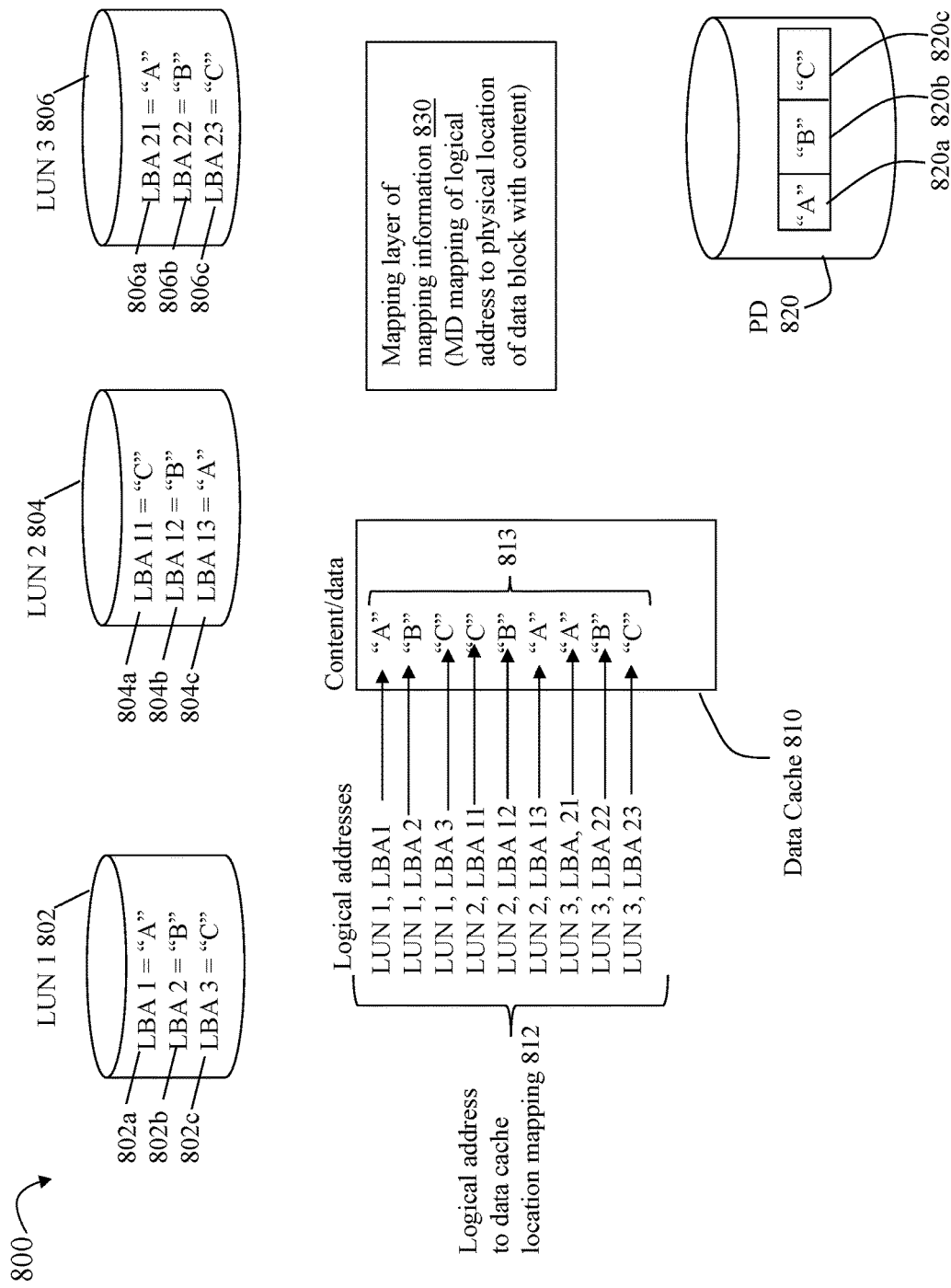
FIG. 8 is an example of components of a data storage system without a data deduplication cache.

Before proceeding with further discussion of the techniques of the present disclosure, in connection with FIG. 8 is an initial discussion of the I/O or data path processing that can be performed in at least one existing system without use of the techniques herein.

Referring to FIG. 8, shown is an example 800 illustrating processing performed in connection with a read I/O operation in at least one system without using the techniques of the present disclosure. In particular, the example 800 is described below in connection with processing read requests or I/O operations.

The example 800 includes the following logical devices, volumes or LUNs: LUN 1 802, LUN 2 804 and LUN 3 806. The LUNs 802, 804 and 806 can comprise the LUNs and associated logical address spaces exposed to a host. In particular as illustrated by the element 802, assume that LUN 1 802 has the content "A" stored at LBA 1, the content "B" stored at LBA 2, and the content "C" stored at LBA 3. As illustrated by the element 802, assume that LUN 2 804 has the content "C" stored at LBA 11, the content "B" stored at LBA 12, and the content "A" stored at LBA 13. As illustrated by the element 806, assume that LUN 3 806 has the content "A" stored at LBA 21, the content "B" stored at LBA 22, and the content "C" stored at LBA 23. The foregoing content as denoted by the elements 802, 804 and 806 can be currently stored on the configured LUNs 802, 804 and 806 as a result of previously issued write I/O operations directed to the particular logical addresses 802*a-c*, 804*a-c* and 806*a-c*.

In connection with processing the foregoing write I/O operations directed to the particular logical addresses 802*a-c*, 804*a-c* and 806*a-c*, the written data or content can be deduplicated such as part of inline processing. The data deduplication processing can detect and deduplicate duplicates of the data block "A" written to LUN 1, LBA 1 (802*a*); LUN 2, LBA 13 (804*c*); and LUN 3, LBA 21 (806*a*). As a result of deduplication processing, the PD 820 denoting the BE non-volatile storage, can physically store only a single instance of the content or data block "A" 820*a* which is referenced by the 3 logical addresses 802*a*, 804*c* and 806*a*. The data deduplication processing can detect and deduplicate duplicates of the data block "B" written to LUN 1, LBA 2 (802*b*), LUN 2, LBA 12 (804*b*) and LUN 3, LBA 22 (806*b*). As a result of deduplication processing, the PD 820 denoting the BE non-volatile storage, can physically store only a single instance of the content or data block "B" 820*b* which is referenced by the 3 logical addresses 802*b*, 804*b* and 806*b*. The data deduplication processing can detect and deduplicate duplicates of the data block "C" written to LUN 1, LBA 3 (802*c*), LUN 2, LBA 11 (804*a*) and LUN 3, LBA 23 (806*c*). As a result of deduplication processing, the PD 820 denoting the BE non-volatile storage, can physically store only a single instance of the content or data block "C" 820*c* which is referenced by the 3 logical addresses 802*c*, 804*a* and 806*c*.

Assume that the above-noted writes to the LUNs 802, 804 and 806 occur at a first point in time T11, where deduplication processing is performed as part of inline processing of the writes. At a later point in time T12 subsequent to T11, assume that the data cache 810 of the data storage system does not contain any data for the LUNs 802, 804 and 806. The data cache 810 can be accessed for both reading and writing data to the data cache 810 such as in connection with processing read and write I/O operations. In particular at the time T12, the data cache does not include cached data for any of the logical addresses 802*a-c*, 804*a-c* and 806*a-c*. At the time T12, a host issues 9 read I/Os to read the data stored in the logical addresses 802*a-c*, 804*a-c* and 806*a-c*. The 9 read I/Os received at the time T12 to read the data stored in the logical addresses 802*a-c*, 804*a-c* and 806*a-c* all result in read cache misses. As a result, each of the 9 read I/Os to read the data stored in the logical addresses 802*a-c*, 804*a-c* and 806*a-c* result in read miss processing where the requested read data blocks stored at the logical addresses 802*a-c*, 804*a-c* and 806*a-c* are retrieved from the PD 820. In at least one existing system, the content stored in the data blocks 820*a-c* can be stored on the PD 820 in a compressed form. In this case, retrieving the content for the 9 read I/Os to read the data stored at each of the logical addresses 802*a-c*, 804*a-c* and 806*a-c* includes using a mapping layer of the mapping information 830 (e.g., MD structure or mapping information) to determine the particular physical storage location of the data block (e.g., one of 820*a-c*) on the PD 820, reading the content from the data block, decompressing the content read, storing the content in its uncompressed or decompressed form in the data cache 810, and returning the decompressed form of the content to service the read I/O. The mapping layer of mapping information 830 can denote the MD structure of mapping information as described above, for example, in connection with the FIGS. 7A-7D. In at least one system, the mapping layer of mapping information 830 of MD can be stored in an additional MD cache which can be accessed for reading and writing.

The element 812 can denote the logical address to data cache location mapping after servicing the 9 read misses or read cache misses to read the data stored in the logical addresses 802*a-c*, 804*a-c* and 806*a-c* from the PD 820. As a result, the data cache 810 includes content stored for the 9 data blocks 813. In such a system as described in connection with FIG. 8, the data cache 810 includes 3 duplicate copies of the data block "A"; 3 duplicate copies of the data block "B"; and 3 duplicate copies of the data block "C". Furthermore, read I/O operation processing described in connection with the data cache 810 determines whether the content or data associated with a requested logical address is located in the data cache 810 based on the mapping 812 or association with each logical address. With FIG. 8 read I/O processing, there is no processing in connection with determining whether the cached data blocks or content 813 stored at different logical addresses are duplicates. As a result, the data cache 810 includes duplicate copies of the same data blocks as noted above, where such duplicate copies of the same data block or content are associated with different logical addresses. Furthermore, read miss costs are incurred in connection with processing all 9 of the read I/O operations to read data stored at the logical addresses 802*a-c*, 804*a-c* and 806*a-c*.

Generally, the data cache 810 can denote a cache storing data in connection with regular I/O processing, such as regular or normal read and write I/O processing. For example, as discussed above, when processing a read I/O operation, a determination can be made as to whether the requested read data is stored in the data cache 810 (e.g., cache hit). If so, the requested read data is obtained from the data cache 810 and returned to the host or other client that issued the read I/O. Otherwise, if the requested read data is not stored in the cache (e.g., cache miss), read miss processing can be performed as discussed above to obtain the uncompressed form of the requested read data which is stored in the data cache 810 and returned to the host or other client in response to an associated read I/O operation. Additionally, when processing a write I/O operation, the data written to a particular logical address can also be stored in the data cache 810 with an associated entry in the mapping 812 for the particular logical address. In one aspect, the data cache 810 can be caching data or content stored at particular logical addresses, whereby the logical addresses can be used as the key for organization, accessing and indexing into the data cache 810, such as illustrated by the logical address to data cache mapping information 812. The data cache 810 can also be characterized as caching of user data stored in the logical address space (e.g., at logical addresses such as on a LUN and LBA of the LUN) where such cached data is also indexed or accessed based on the logical address where the cached data is stored.

The techniques of the present disclosure described in the following paragraphs improve upon the foregoing processing described in connection with FIG. 8 by further introducing and using a deduplicated data cache.

In at least one embodiment, the deduplicated data cache can be implemented as a separate cache in addition to the data cache 810 caching data indexed or organized by logical addresses and in addition to the metadata cache including the mapping information of the MD structure such as described in connection with FIGS. 7A-7D. In at least one embodiment, the data promoted and stored to the deduplicated data cache can be accessed for read-only. In at least one embodiment, the deduplicated data cache includes only unique instances of uncompressed data blocks that have been deduplicated and are stored at multiple logical addresses. In at least one embodiment, each data block stored in the deduplicated data cache can have a reference count that is at least a minimum threshold value. The reference count can denote the number of logical addresses at a point in time that reference the associated data block, where the content stored in the data block is stored at each such logical address. In at least one embodiment, the deduplicated data cache can be indexed, accessed and organized using keys associated with the data blocks. The key can be a reference, pointer or address used to access the data block. In at least one embodiment, the key can be an address or pointer used to indirectly access the data block. In at least one embodiment, the key for a data block stored in the deduplicated data cache can be the address of, or pointer to, an entry in a VLB node, page or structure of the mapping information, where the VLB entry includes the reference count for the data block and where the VLB entry includes the address of, or pointer to, the data block. Use of the deduplicated data cache is described below in connection with examples described below.

Figure 9A:
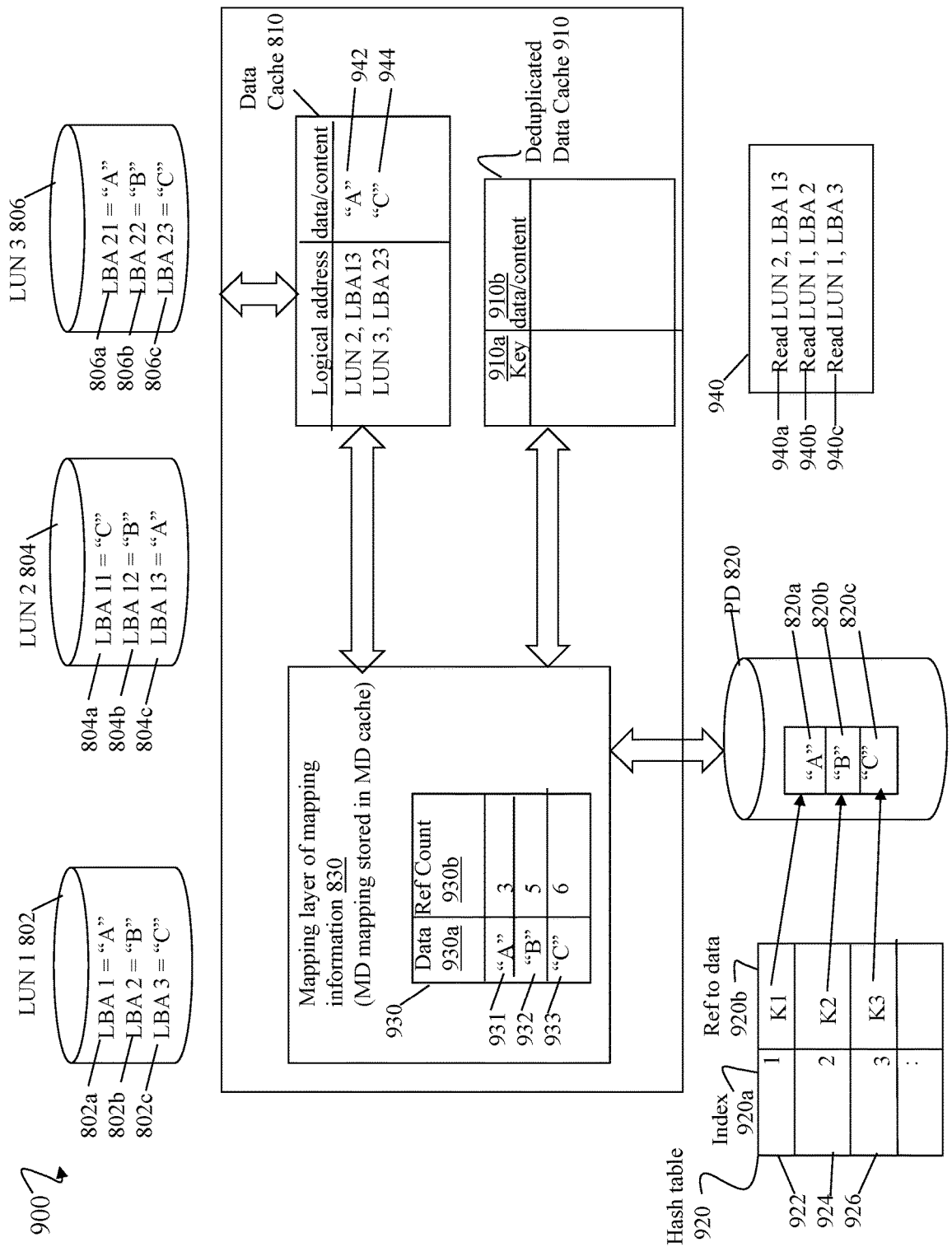
FIGS. 9A-9B are examples illustrating components including a data deduplication cache in accordance with the techniques of the present disclosure.
Figure 9B:
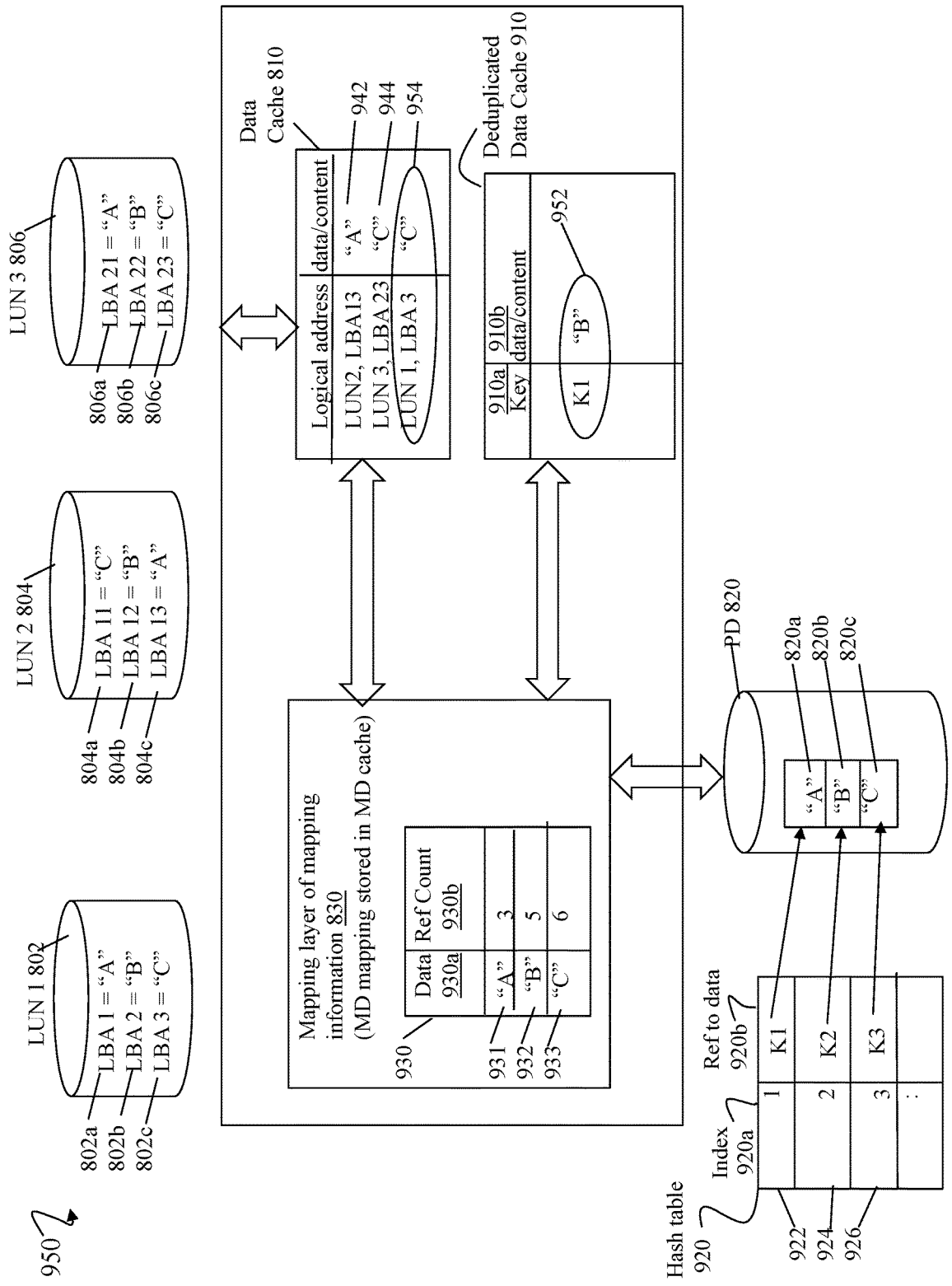

A first example illustrates an embodiment including the data deduplicated cache in connection with read I/O processing in FIGS. 9A and 9B.

Referring to FIG. 9A, shown is an example 900 illustrating components that can be included in a configuration of a data storage system in an embodiment in accordance with the techniques of the present disclosure. The example 900 includes similarly numbered components as described above in connection with FIG. 8 along with additional components discussed below.

The LUNs 802, 804 and 806 can denote LUNs having storage provisioned on the BE PD 820 on the data storage system, where such LUNs are exposed to one or more hosts (not illustrated). The example 900 denotes the state of the data storage system and its components at a point in time T13 subsequent to the time T12 denoted above in connection with FIG. 8, where writes have been previously issued to store data at the logical addresses 802a-c, 804a-c and 806a-c as discussed in connection with FIG. 8. The content or data of such writes is stored on the PD 820 where data written to the logical addresses 802a-c, 804a-c and 806a-c has been deduplicated as discussed above in connection with FIG. 8. Additionally, the data cache 810 at time T13 includes the cached data "A" for the logical address LUN 2, LBA 11 (entry 942), and includes the cached data "C" for the logical address LUN 3, LBA 23 (entry 944).

The hash table 920 can be similar to the hash table as discussed, for example, in connection with FIG. 2A used to access and store single instances of unique data blocks on the PD 820. The hash table 920 includes a first column of indexes 920a, and a second column of references (refs) used to access a stored data block 920b. Each data block stored on the PD 820 has a corresponding entry in the hash table 920. For example, the data blocks 820a-c stored on the PD 820, respectively, have corresponding entries 922, 924 and 926 of the hash table 920. A hash function applied to a data block generates a hash value, HV, that is mapped to a corresponding entry and index of the hash table for the data block. For example, the first or initial time that the content "A" is written, a hash value is determined for "A" by applying the hash function to "A" to obtain a HV for "A". Assume that the HV=1 is determined for "A" where HV=1 is mapped to the index=1 of the entry 922 and where it is determined that "A" is currently not stored on the PD 820 since the entry 922 is not associated with an existing data block matching "A". In response, "A" is stored in the data block 820a and associated with the entry 922. The value of K1 in the column 920b of the entry 922 denotes a reference, pointer or address used to access the data block at which the content "A" is stored.

In at least one embodiment, the value K1 in the column 920b of the entry 922 can denote a pointer or address used to indirectly access the data block containing the content "A". In at least one embodiment, K1 in the column 920b of the hash table entry 922 can be an address of a first VLB entry, where the first VLB entry further includes a field that points to (e.g., is an address of) the data block 820a storing the content "A" associated with the hash table entry 922. For example with reference back to FIG. 7D, K1 as well as each value in the column 920b can be a pointer to, or an address of, a VLB entry such as the address of the VLB entry 1357a, where the VLB entry 1357a further includes a field that points to (1359a) the data block 1362. Put another way, K1 can be pointer or address represented by 1372 and 1358a of FIG. 7D, where 1372 and 1358a are both pointers to, and denote the same address of, the VLB entry 1357a. In a similar manner, the value K2 of the column 920b in the entry 924 is an address of a second VLB entry used to indirectly access the data block 820b, and the value K3 of the column 920c in the entry 926 is an address of a third VLB entry used to indirectly access the data block 820c. K2 in the column 920b of the hash table entry 924 can be an address of the second VLB entry, where the second VLB entry further includes a field that points to (e.g., is an address of) the data block 820b storing the content "B" associated with the hash table entry 924. K3 in the column 920c of the hash table entry 926 can be an address of the third VLB entry, where the third VLB entry further includes a field that points to (e.g., is an address of) the data block 820c storing the content "C" associated with the hash table entry 926. Other values in the column 920b can similarly denote addresses or pointers into the mapping information (e.g., MD structure such as of FIGS. 7A-7D) used to indirectly access data blocks stored on the PD 820

The mapping layer of mapping information 830 can include the MD structure stored in the MD cache as described above. Additionally, in the example 900, the table 930 can represent current reference counts for associated data blocks as stored in the mapping information and MD structure, such as in connection with FIGS. 7A-7D. For simplicity of illustration in the example of FIG. 9A, the reference counts and associated data blocks have been included in the table 930 even though an implementation can include the extracted reference counts of the column 930b in the reference count fields of VLB entries of the MD or mapping information as described in connection with FIG. 7D. The table 930 includes a data block column 930a and a ref (reference) count column 930b. Each row or entry of the table 930 denotes the ref count (930b) at the time T13 for a particular data block storing the content or data (930a). The entry 931 indicates that the data block 820a storing "A" has a reference count of 3. The entry 932 indicates that the data block 820b storing "B" has a reference count of 5. The entry 933 indicates that the data block 820c storing "C" has a reference count of 6.

The deduplicated data cache 910 can include entries, where each entry includes a key 910a and associated data or content 910b stored in the deduplicated data cache 910. As illustrated in the example 900, the deduplicated data cache 910 at the time T13 includes no entries. Cached data (910b) stored in the deduplicated data cache 910 is indexed, accessed and organized using keys (910a) associated with the cached data. In at least one embodiment, values of the keys 910a can be references, pointers or addresses used to access the data blocks as stored on the PD 820. In at least one embodiment, each key 910a can be an address or pointer used to indirectly access the data block on the PD 820. In at least one embodiment, the key 910a for a data block stored in the deduplicated data cache can be the address of, or pointer to, an entry in a VLB node, page or structure of the mapping information 830, where the VLB entry includes the reference count for the data block and where the VLB entry includes the address of, or pointer to, the data block. Thus, in such an embodiment, the values used for the keys 910a of the deduplicated data cache 910 are the same values used for the references 920b of the hash table 920. For example, if the content "A" were stored in an entry of the deduplicated data cache, the entry would have an associated key 910a having the value K1 as denoted by the column 920b of the entry 922 of the hash table. In this manner, a reference or pointer K1 used to access the data block 820a for "A" (where K1 is used as a value for the column 920b of the hash table entry 922 for the data block 820a) can also be used as an index into the deduplicated data cache 910 to query whether the data block is stored in the deduplicated data cache 910. Further, assuming "A" is stored in the deduplicated data cache 910, the reference or pointer K1 can be used to identify the particular entry or location in the deduplicated data cache 910 including the cached content "A".

The element 940 includes 3 read I/Os 940a-c received at the data storage system at the time T13 from an external host. What will now be described with reference to FIG. 9A is processing performed on the data storage system to service the 3 read I/Os 940a-c. For simplicity, assume that the 3 read I/Os are serviced in the sequential order 940a-c.

Figure 9C:
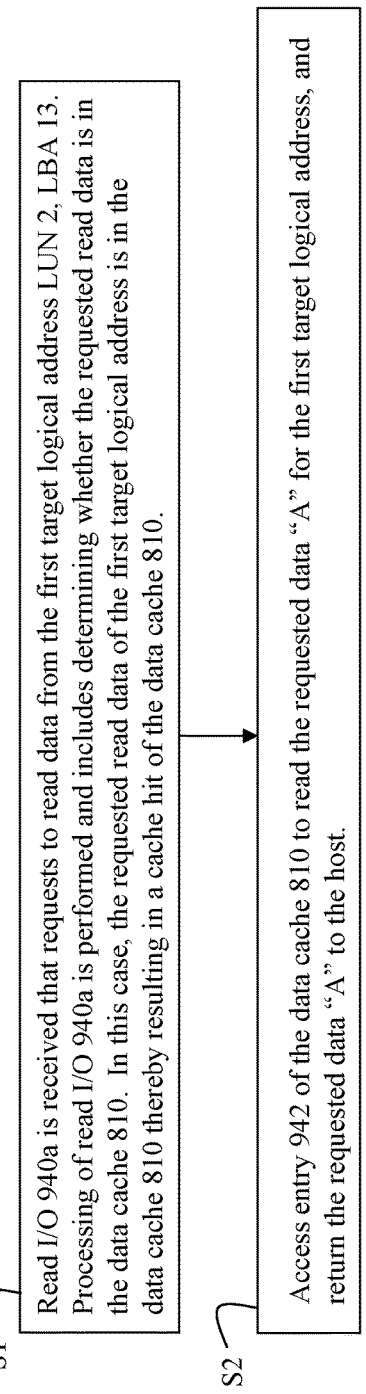
FIGS. 9C, 9D, 9E, 10, 11A, 11B, 11C and 12 are flowcharts of processing steps that can be performed in an embodiment in accordance with the techniques of the present disclosure.

The read I/O 940a is a request to read data from the first target logical address LUN 2, LBA 13. With reference to FIG. 9C, at a step S1, the read I/O 940a is received and processing is performed to determine whether the requested read data for the first target logical address LUN 2, LBA 13 is stored in the data cache 810. In this case, the requested read data for the read I/O 940a is stored in the data cache 810 thereby resulting in a cache hit for the data cache 810. Following the step S1, the entry 942 of the data cache 810 is accessed to read the requested data "A" and returned in a step S2 to the host.

Figure 9D:
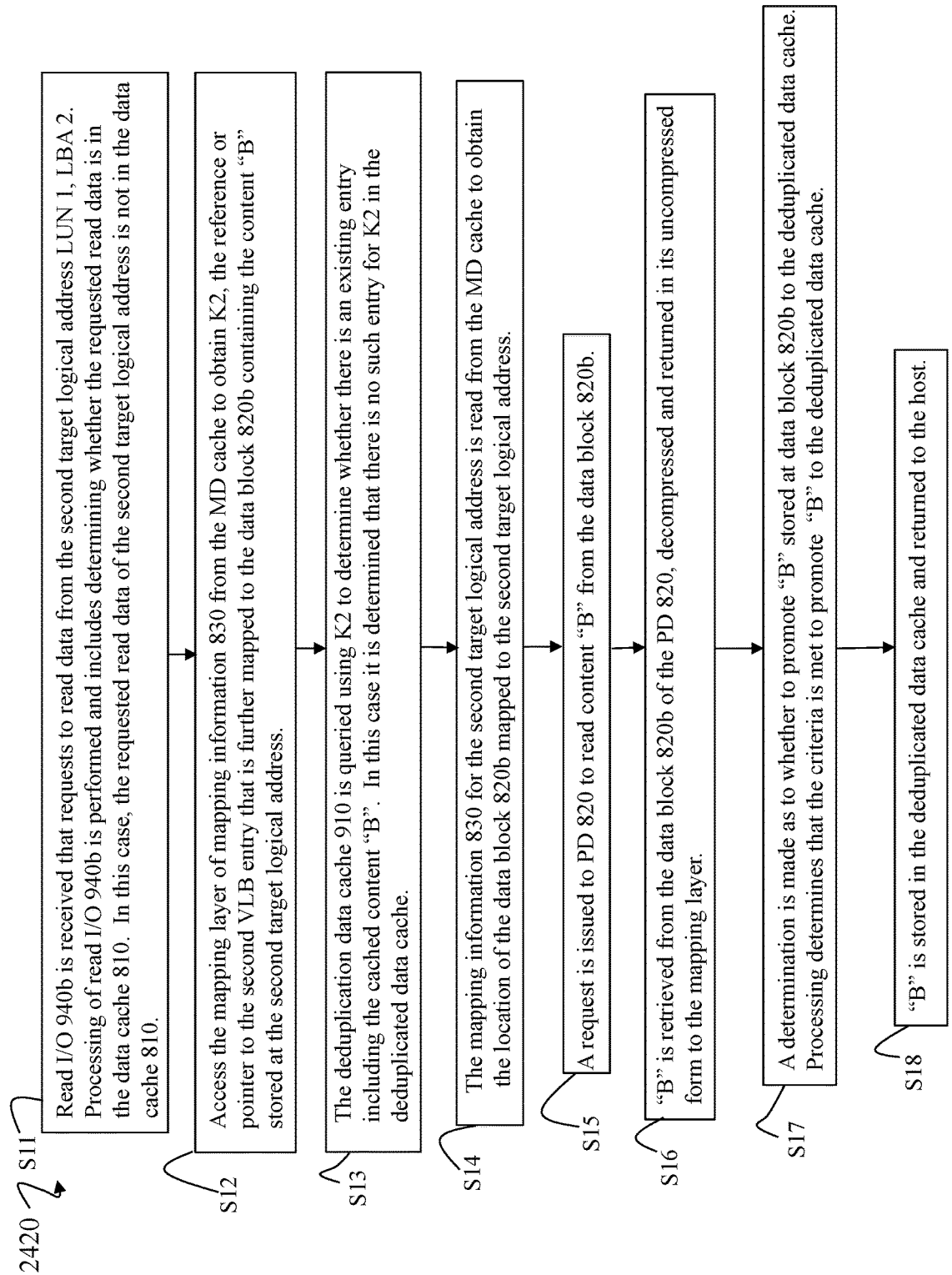

The read I/O 940b is a request to read data from the second target logical address LUN 1, LBA 2. With reference to FIG. 9D, at a step S11, the read I/O 940b is received and processing is performed to determine whether the requested read data for the target logical address LUN 1, LBA 2 is stored in the data cache 810. In this case, the requested read data for the read I/O 940b is not in the data cache 810 so processing is performed in a step S12 following S11 to access the mapping layer of mapping information 830. As discussed above the mapping information 830 includes MD used to map the second target logical address to an associated physical storage location of a data block including content stored at the second target logical address. The mapping information 830 for the second target logical address LUN 1, LBA 2 is read from the MD cache to obtain K2, the reference or pointer to the second VLB entry that is further mapped to the data block 820b containing the content "B" stored at the second target logical address LUN 1, LBA 2.

Following the step S12 is a step S13. In the step S13, the deduplicated data cache 910 is queried using K2 to determine whether there is an existing entry including the cached content "B" (e.g., where "B" is stored at the data block 820b). In this case, the step S13 determines that there is no such entry in the deduplicated data cache 910 for cached content "B". Following the step S13 is a step S14 where the mapping information 830 for the second target logical address LUN 1, LBA 2 is read from the MD cache to obtain the location of the data block 820b mapped to the second target logical address LUN 1, LBA 2.

Following the step S14 in a step S15, the value K2 (which points to the second VLB entry that is further mapped to the data block 820b) is used to access the second VLB entry which includes the address of the data block 820b. In the step S15, a request is issued to the PD 820 to read the content "B" from the data block 820b. Following the step S15 is a step S16 where the content "B" from the data block 820b is retrieved from the PD 820, decompressed and returned in its uncompressed form to the mapping layer.

Following the step S16 is a step S17 where a determination is made as to whether to promote the content "B" stored at the data block 820b to the deduplicated data cache. As denoted by the entry 932 of the mapping information, the reference count for the data block "B" is 5. In this example, assume that criteria for promoting a data block to the deduplicated data cache 910 specifies that the reference count must be at least the minimum threshold of 5. In this case, the reference count for the data block "B" is 5 and can be promoted to the deduplicated data cache 910 because the reference count of 5 meets the required criteria including the minimum threshold of 5. Following the step S17 is a step S18 where the requested data "B" stored at the second target logical address is stored in the deduplicated data cache 910 and then returned to the host.

Figure 9E:
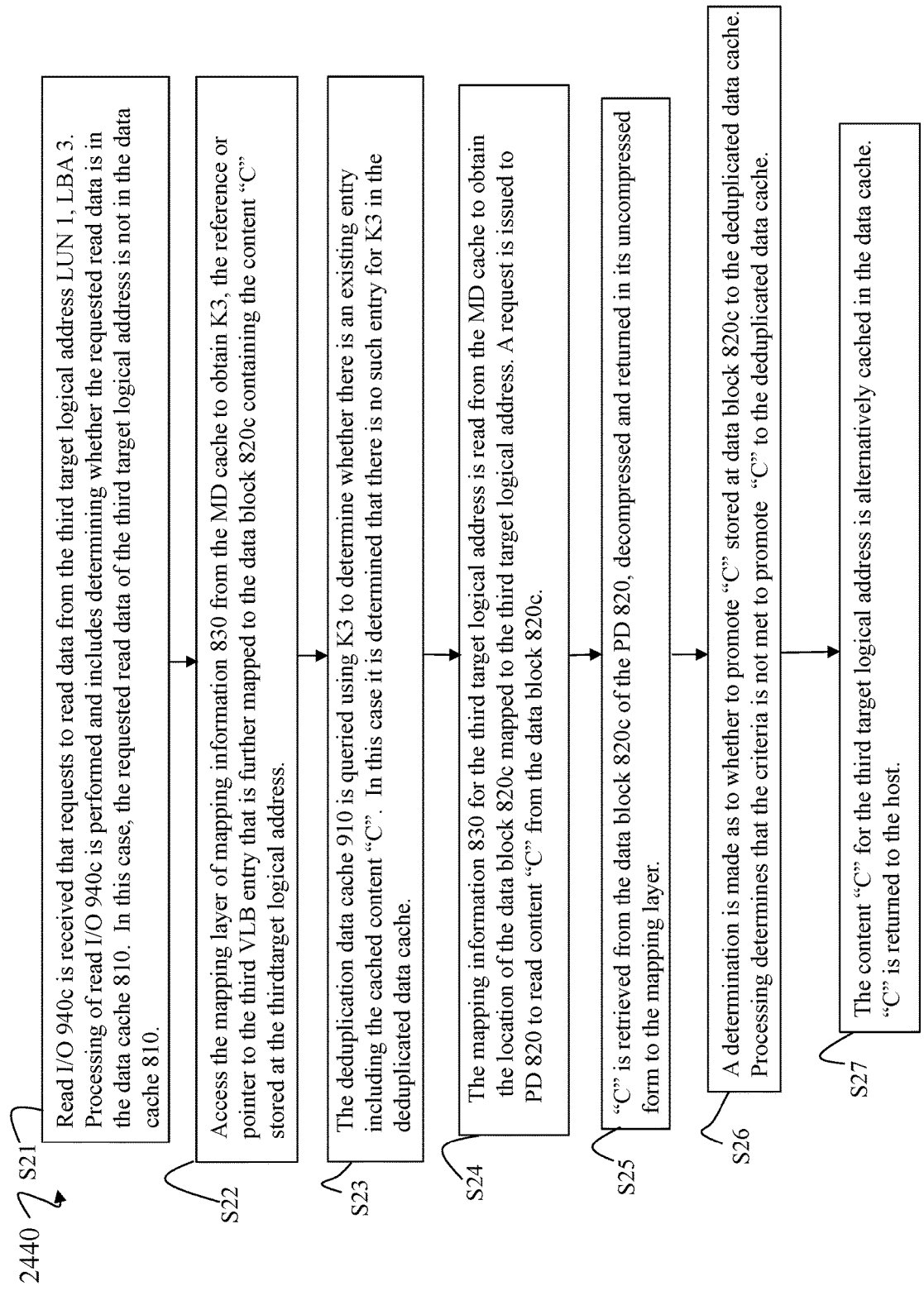

The read I/O 940c is a request to read data from the third target logical address LUN 1, LBA 3. with reference to FIG. 9E, at the step S21, the read I/O 940c is received and processing is performed to determine whether the requested read data for the third target logical address LUN 1, LBA 3 is stored in the data cache 810. In this case, the requested read data for the read I/O 940c is not in the data cache 810 so processing is performed in a step S22 (following S21) to access the mapping layer of mapping information 830. As discussed above the mapping information 830 includes MD used to map the third target logical address to an associated physical storage location of a data block including content stored at the second target logical address. The mapping information 830 for the third target logical address LUN 1, LBA 3 is read from the MD cache to obtain K3, the reference or pointer to the third VLB entry that is further mapped to the data block 820c containing the content "C" stored at the third target logical address LUN 1, LBA 3. Following the step S22, in a step S23, the deduplicated data cache 910 is queried using K3 to determine whether there is an existing entry including the cached content "C" (e.g., where "C" is stored at the data block 820c). In this case, the step S23 determines that there is no such entry in the deduplicated data cache 910 for cached content "C".

Following the step S23 is a step S24 where the mapping information 830 for the third target logical address LUN 1, LBA 3 is read from the MD cache to obtain the location of the data block 820c mapped to the third target logical address LUN 1, LBA 3. In the step S24, the value K3 (which points to the third VLB entry that is further mapped to the data block 820c) is used to access the third VLB entry which includes the address of the data block 820c. In the step S24, a request is issued to the PD 820 to read the content "C" from the data block 820c. Following the step S24 is a step S25 where the content "C" from the data block 820c is retrieved from the PD 820, decompressed and returned in its uncompressed form to the mapping layer.

Following the step S25 is a step S26 where a determination is made as to whether to promote the content "C" stored at the data block 820c to the deduplicated data cache 910. As denoted by the entry 933 of the mapping information, the reference count for the data block "C" is 6. In this example, assume that criteria for promoting a data block to the deduplicated data cache 910 specifies that the reference count must be at least the minimum threshold of 5. In this case, the reference count for the data block "C" is 6 and is therefore a candidate for promotion to the deduplicated data cache 910 because the reference count of 6 meets the required criteria including the minimum threshold of 5. However, the criteria for promoting "C" to the deduplicated data cache 910 can also specify that the data block "C" is not promoted to the deduplicated data cache 910 if the data block "C" is already cached in at least one entry of the data cache 810. In this example, the data block "C" is already stored in the entry 944 of the data cache 810 so "C" is not promoted to the deduplicated data cache 910. Following the step S26 is a step S27 where the requested data "C" stored at the third target logical address can be stored in the data cache 810 and then returned to the host.

Referring to FIG. 9B, shown is an example 950 denoting the state of the data storage system after servicing the 3 read I/Os 940. The example 950 includes elements similarly numbered as in FIG. 9A. Additionally, the element 952 of FIG. 9B indicates the update made to the deduplicated data cache 910 as a result of processing the read I/O 940b; and the element 954 of FIG. 9B indicates the update made to the data cache 810 as a result of processing the read I/O 940c.

Figure 10:
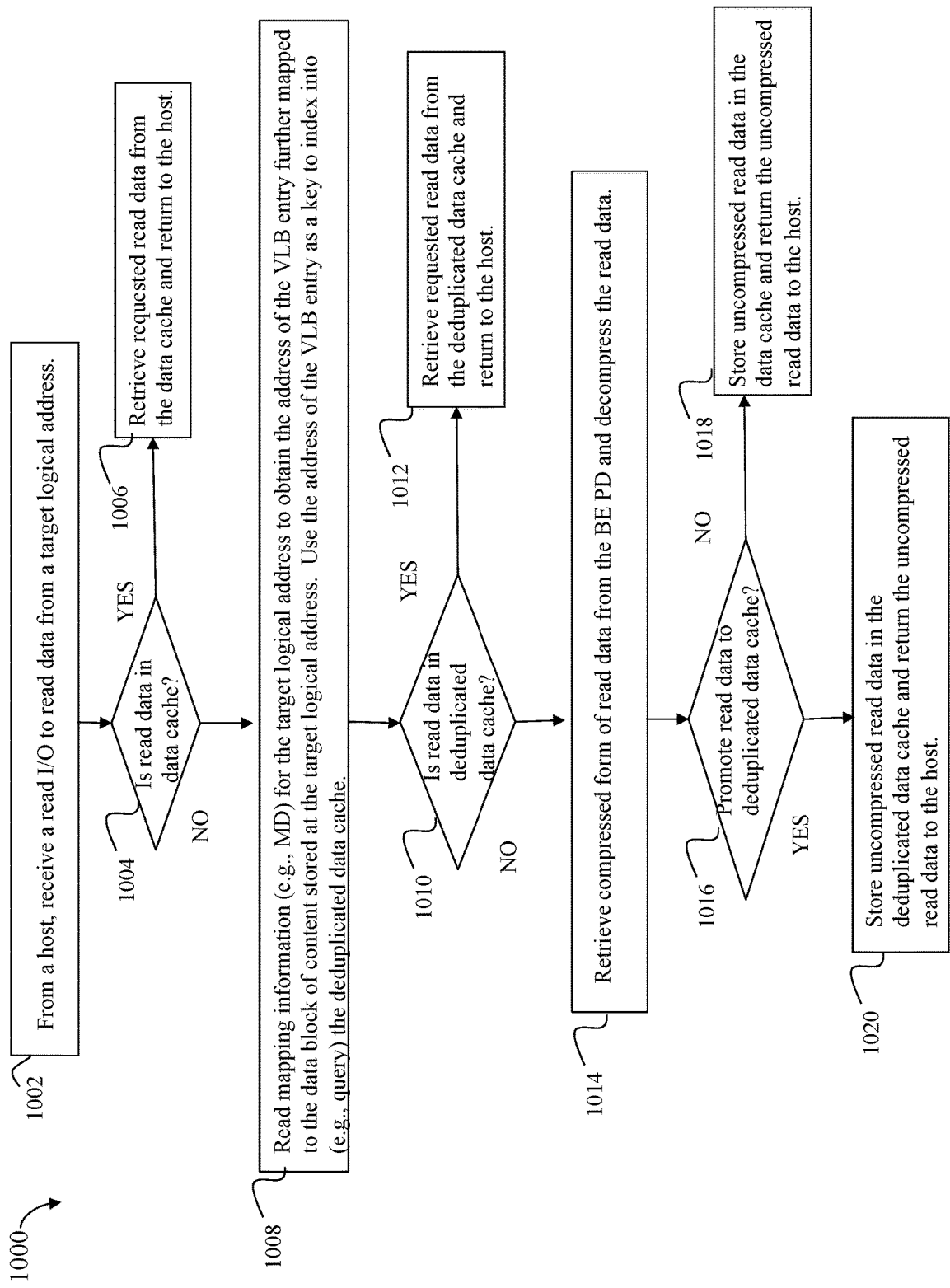

Referring to FIG. 10, shown is a flowchart 1000 summarizing processing as described above in connection with FIGS. 9A and 9B that can be performed in processing read I/Os in at least one embodiment in accordance with the techniques of the present disclosure.

At the step 1002, a read I/O operation is received from a host. The read I/O operation is a request to read data from a target logical address that can be expressed, for example, as a LUN and LBA on the LUN. From the step 1002, control proceeds to the step 1004.

At the step 1004, a determination is made as to whether the data cache includes the requested read data stored at the target logical address. The data cache can include cached data for different logical addresses where the cached data can be indexed or accessed by logical address. If the step 1004 determines that the read data requested is in cache, control proceeds to the step 1006. At the step 1006, the requested read data for the target logical address is retrieved from the data cache and returned to the host. If the step 1004 evaluates to no, control proceeds to the step 1008.

At the step 1008, processing is performed to read the mapping information (e.g., MD) for the target logical address to obtain the address of the VLB entry further mapped to the data block of content stored at the target logical address. The address of the VLB entry can be used as a key to index into (e.g., query) the deduplicated data cache. From the step 1008, control proceeds to the step 1010.

At the step 1010, a determination is made as to whether the read data is stored in the deduplicated data cache. The determination of the step 1010 can be performed using the address of the VLB entry mapped to the target logical address. If the step 1010 evaluates to yes, control proceeds to the step 1012 where the requested read data can be retrieved from the deduplicated data cache and returned to the host. In at least one embodiment, data that is returned from the deduplicated cache, such as in the step 1012, is not also cached in the data cache, for example, as part of the read I/O processing. Thus, the step 1012 can avoid storing the requested read data (which is obtained from the deduplicated data cache) into the data cache.

If the step 1010 evaluates no, control proceeds to the step 1014 to retrieve the compressed form of the read data from the BE PD, and then decompress the read data retrieved. As discussed above, the address of the VLB entry mapped to the data block of content stored at the target logical address can be used to access the data block and retrieve the content (e.g., the requested read data). From the step 1014, control proceeds to the step 1016.

At the step 1016, a determination is made as to whether to promote the uncompressed read data to the deduplicated data cache. Consistent with other discussion herein, the determination of whether to promote the read data to the deduplicated data cache can be made with respect to one or more specified criteria where all such criteria must be met for the read data to be promoted and stored in the data deduplication cache. For example, the criteria can include a minimum threshold for the reference count so that the reference count of the read data must be at least the minimum threshold to be promoted to the data deduplication cache. The criteria can specify that each data block stored in the deduplicated data cache is not also stored in the data cache. Thus, a data block B1 is not promoted to the deduplicated data cache if there is already an existing entry in the data cache storing the same data block B1. The criteria can specify that each data block stored in the deduplicated data cache is unique with respect to the deduplicated data cache. Thus, although the data cache can include two copies of the same data block B1, where each of the two copies is associated with a different logical address, the deduplicated data cache can be characterized as including only unique or single instances of data blocks. The criteria can specify that each data block stored in the deduplicated data cache has been deduplicated where the same data block is stored at multiple logical addresses as detected by deduplication processing.

If the step 1016 evaluates to no control proceeds to the step 1018. At the step 1018, processing is performed to store the uncompressed read data in the data cache and return the uncompressed read data to the host. If the step 1016 evaluates to yes, control proceeds to the step 1020. At the step 1020, the uncompressed read data is stored in the deduplicated data cache and the uncompressed read data is returned to the host. In at least one embodiment, data that is returned from the deduplicated cache, such as in the step 1020, is not also cached in the data cache, for example, as part of the read I/O processing. Thus, the step 1020 in at least one embodiment can avoid storing the requested read data (which is obtained from the deduplicated data cache) into the data cache.

What will now be described in connection with FIGS. 11A-C and FIG. 12 is processing that can be performed in connection with write I/O processing in at least one embodiment in accordance with the techniques of the present disclosure.

Figure 11A:
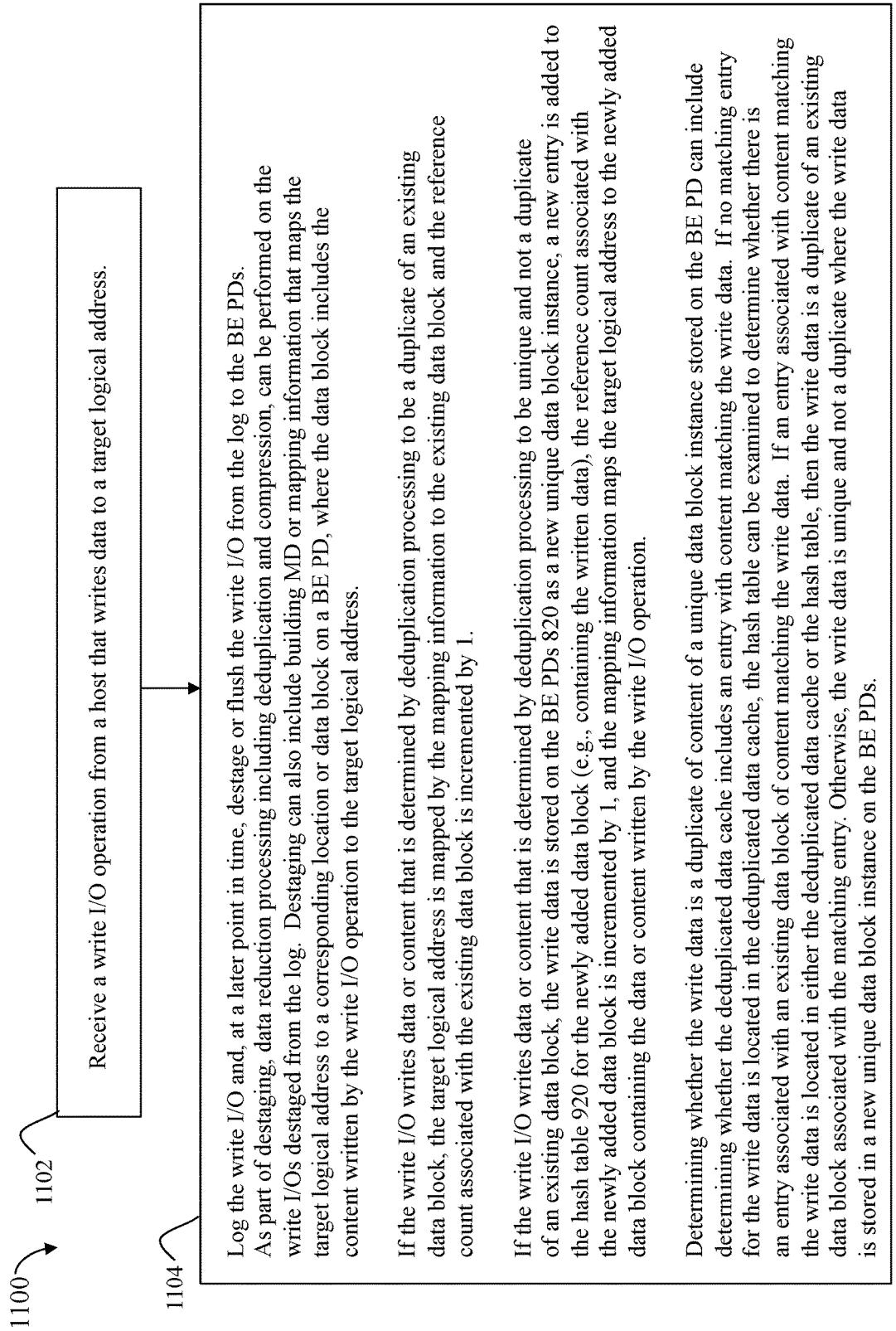

Referring to FIG. 11A, shown is a flowchart 1100 of processing that can be performed in connection with a write I/O operation in at least one embodiment in accordance with the techniques of the present disclosure.

At the step 1102, a write I/O operation can be received from the host at the data storage system where the write I/O operation writes data to a target logical address. From the step 1102, control proceeds to the step 1104.

At the step 1104, processing can be performed to log the received write I/O and, at a later point in time, destage or flush the write I/O from the log to the BE PDs. As part of destaging, data reduction processing including deduplication and compression, can be performed on the write I/Os destaged from the log. Destaging can also include building MD or mapping information that maps the target logical address to a corresponding location or data block on a BE PD, where the data block includes the content written by the write I/O operation to the target logical address.

At the step 1104, if the write I/O writes data or content that is determined by deduplication processing to be a duplicate of an existing data block, the target logical address is mapped by the mapping information to the existing data block and the reference count associated with the existing data block is incremented by 1.

At the step 1104, if the write I/O writes data or content that is determined by deduplication processing to be unique and not a duplicate of an existing data block, the write data is stored on the BE PDs 820 as a new unique data block instance, a new entry is added to the hash table 920 for the newly added data block (e.g., containing the written data), the reference count associated with the newly added data block is incremented by 1, and the mapping information maps the target logical address to the newly added data block containing the data or content written by the write I/O operation.

In the step 1104, determining whether the write data is a duplicate of content of a unique data block instance stored on the BE PD can include determining whether the deduplicated data cache includes an entry with content matching the write data. If no matching entry for the write data is located in the deduplicated data cache, the hash table can be examined to determine whether there is an entry associated with an existing data block of content matching the write data. If an entry associated with content matching the write data is located in either the deduplicated data cache or the hash table, then the write data is a duplicate of an existing data block associated with the matching entry. Otherwise, the write data is unique and not duplicate where the write data is stored in a new unique data block instance on the BE PDs.

Figure 11B:
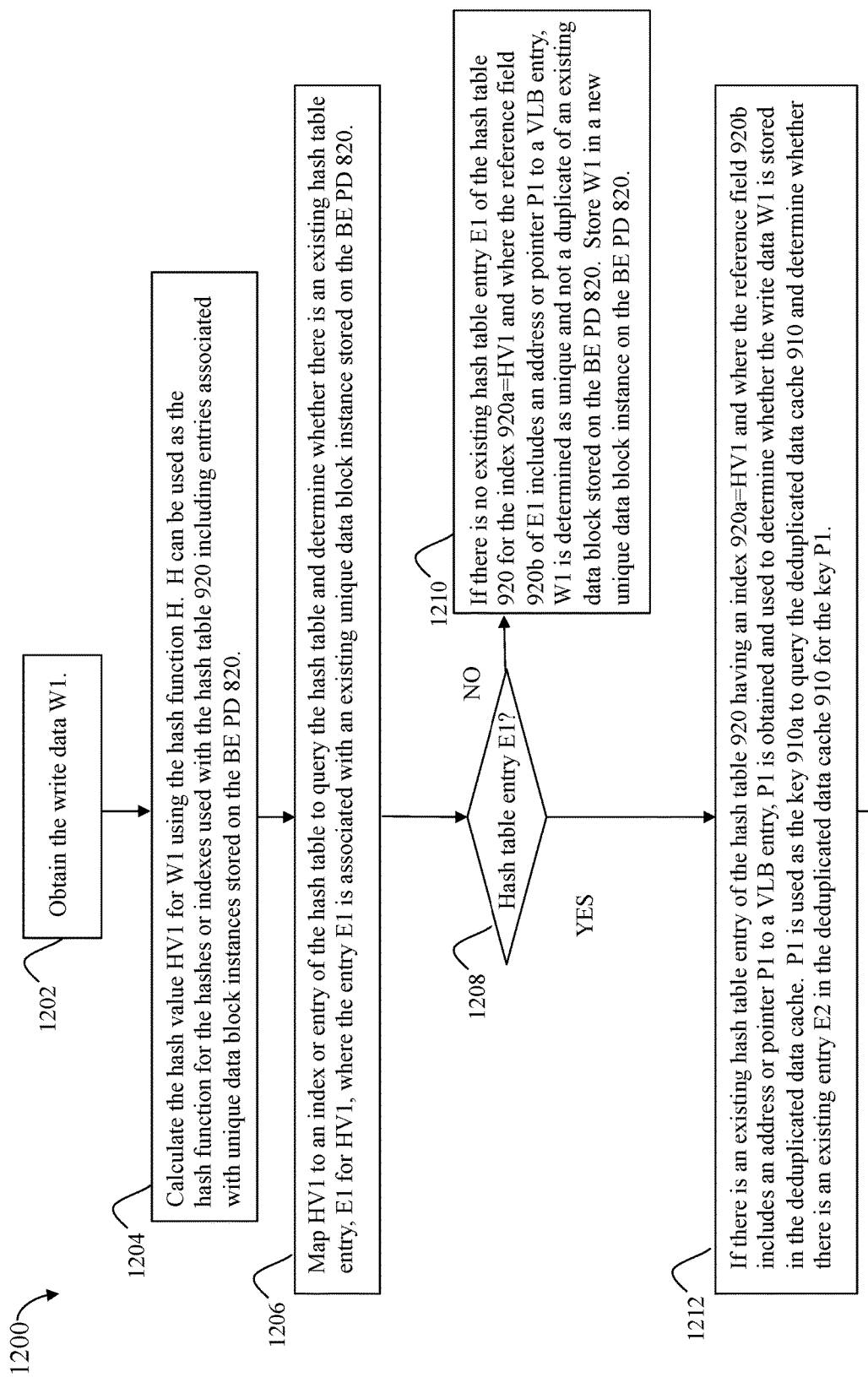
Figure 11C:
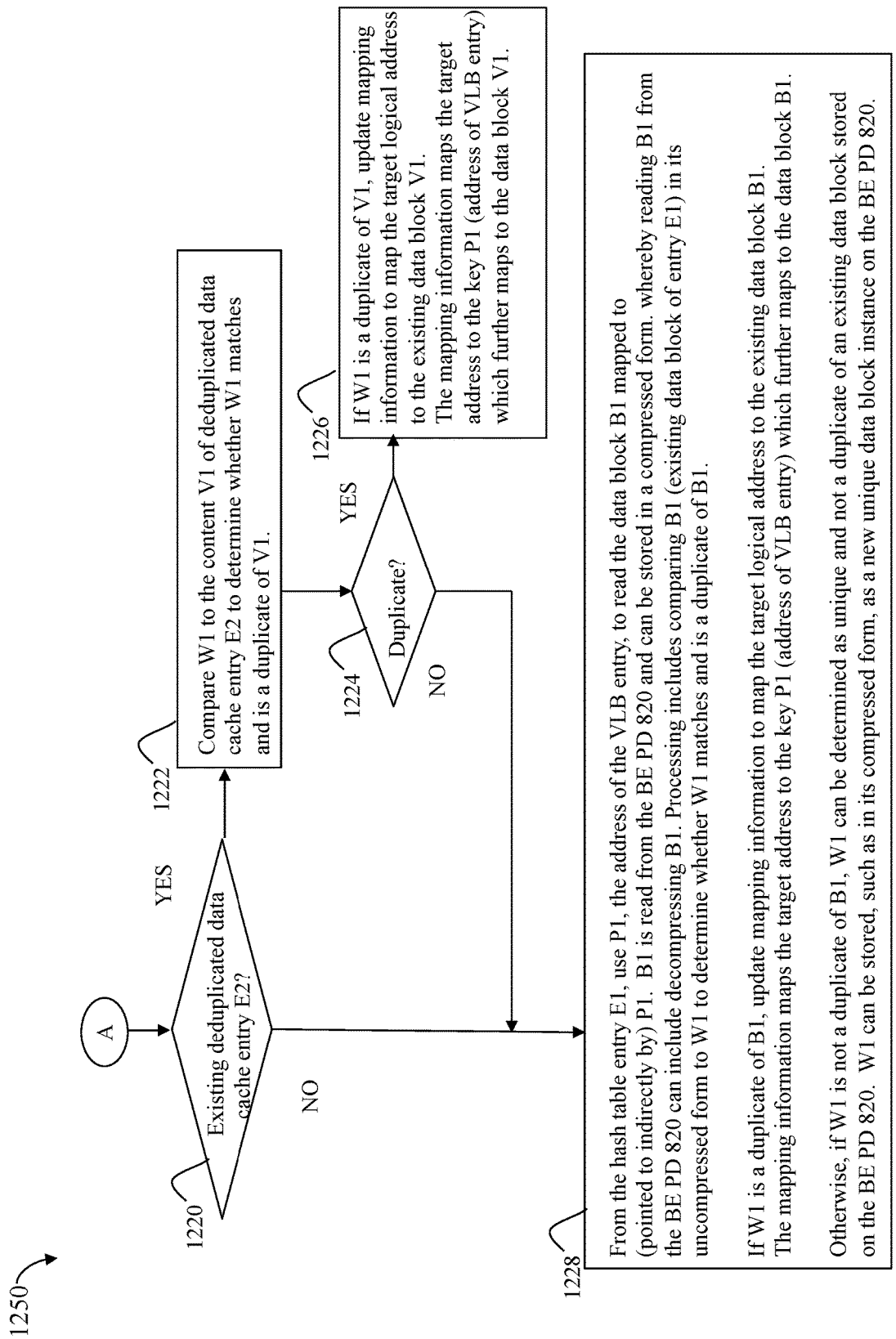

With reference to FIGS. 11B and 11C, shown are processing steps of the flowcharts 1200, 1250 providing further detail regarding deduplication processing in at least one embodiment in accordance with the techniques of the present disclosure. Generally, the FIGS. 11B-C provide further details regarding deduplication processing of the step 1104 performed in connection with the write I/O operation received.

At the step 1202, the write data W1 written by the write I/O operation can be obtained. From the step 1202, control proceeds to the step 1204.

At the step 1204, processing can be performed to calculate the hash value HV1 for W1 using the hash function H. Referring back to FIG. 9A, H can be used as the hash function for the hashes or indexes used with the hash table 920 including entries associated with unique data block instances stored on the BE PD 820. From the step 1204, control proceeds to the step 1206.

At the step 1206, processing can be performed to map HV1 to an index or entry of the hash table to query the hash table and determine whether there is an existing hash table entry, E1 for HV1, where the entry E1 is associated with an existing unique data block instance stored on the BE PD 820. From the step 1206, control proceeds to the step 1208.

At the step 1208, a determination is made as to whether the hash table includes the existing entry E1 mapped to HV1 where E1 is mapped to or associated with an existing unique data block instance stored on the BE PD 820. In one embodiment with reference back to FIG. 9A, the step 1208 can include locating an entry of the hash table 920 where the index 920a=HV1, and where the reference field 920b is non-null and includes an address of a VLB entry, where the VLB entry further includes the address of the existing unique data block instances associated with the hash table entry. If the field 920b is null, it can mean that the hash table entry is not associated with any existing data block. If the step 1208 evaluates to no, control proceeds to the step 1210.

At the step 1210, if there is no existing hash table entry E1 of the hash table 920 for the index 920a=HV1 and where the reference field 920b of E1 includes an address or pointer P1 to a VLB entry, W1 is determined as unique and not a duplicate of an existing data block stored on the BE PD 820. Store W1 in a new unique data block instance on the BE PD 820. In some embodiments, data blocks can be stored on the BE PD 820 in a compressed form so that storing W1 can include compressing W1 and then storing the compressed form of W1 on the BE PD 820. If the step 1208 evaluates to yes, control proceeds to the step 1212.

At the step 1212, if there is an existing hash table entry of the hash table 920 having an index 920a=HV1 and where the reference field 920b includes an address or pointer P1 to a VLB entry, P1 is obtained and used to determine whether the write data W1 is stored in the deduplicated data cache. P1 is used as the key 910a to query the deduplicated data cache 910 and determine whether there is an existing entry E2 in the deduplicated data cache 910 for the key P1. From the step 1212 control proceeds to the step 1220.

At the step 1220, a determination is made as to whether there is an existing deduplicated data cache entry E2 for the key P1. If the step 1220 evaluates to no, control proceeds to the step 1228 discussed below.

If the step 1220 evaluates to yes, control proceeds to the step 1222. At the step 1222, processing can be performed to compare W1 to the content V1 of the deduplicated data cache entry E2 to determine whether W1 matches and is a duplicate of V1. The deduplicated data cache can include the uncompressed form of any cached data. From the step 1222, control proceeds to the step 1224. At the step 1224, a determination is made as to whether W1 is a duplicated of the data block V1. If the step 1224 evaluates to yes, control proceeds to the step 1226. At the step 1226, if W1 is determined to be a duplicate of V1, processing can be performed to update the mapping information (e.g., MD) to map the target logical address of the write I/O operation to the existing data block V1, and also increment by 1 the reference counter associated with the existing data block V1. The mapping information maps the target address to the key P1 (e.g., address of a VLB entry) which is further mapped to the data block V1 (e.g., the VLB entry includes an address of or pointer to the data block). If the step 1224 evaluates to no, control proceeds to the step 1228.

At the step 1228, from the hash table entry E1, processing can be performed to use P1, the address of the VLB entry, to read the data block B1 mapped to (e.g., pointed to indirectly by) P1. The step 1228 can include comparing B1 (the existing data block of entry E1) to W1 to determine whether W1 matches and is a duplicate of B1. B1 is read from the BE PD 820 and can be stored in a compressed form. whereby reading B1 from the BE PD 820 can include decompressing B1. Processing includes comparing B1 (existing data block of entry E1) in its uncompressed form to W1 to determine whether W1 matches and is a duplicate of B1.

At the step 1228, if W1 is determined to be a duplicate of B1, processing can be performed to update mapping information to map the target logical address to the existing data block B1, and increment by 1 the reference count associated with the existing data block B1. The mapping information maps the target address to the key P1 (address of VLB entry) which further maps to the data block B1. Otherwise, if W1 is determined in the step 1228 as not a duplicate of B1, W1 can be determined as unique and not a duplicate of an existing data block stored on the BE PD 820. W1 can be stored as a new unique data block instance on the BE PD 820. W1 can be stored, such as in its compressed form, as a new unique data block instance on the BE PD 820.

Figure 12:
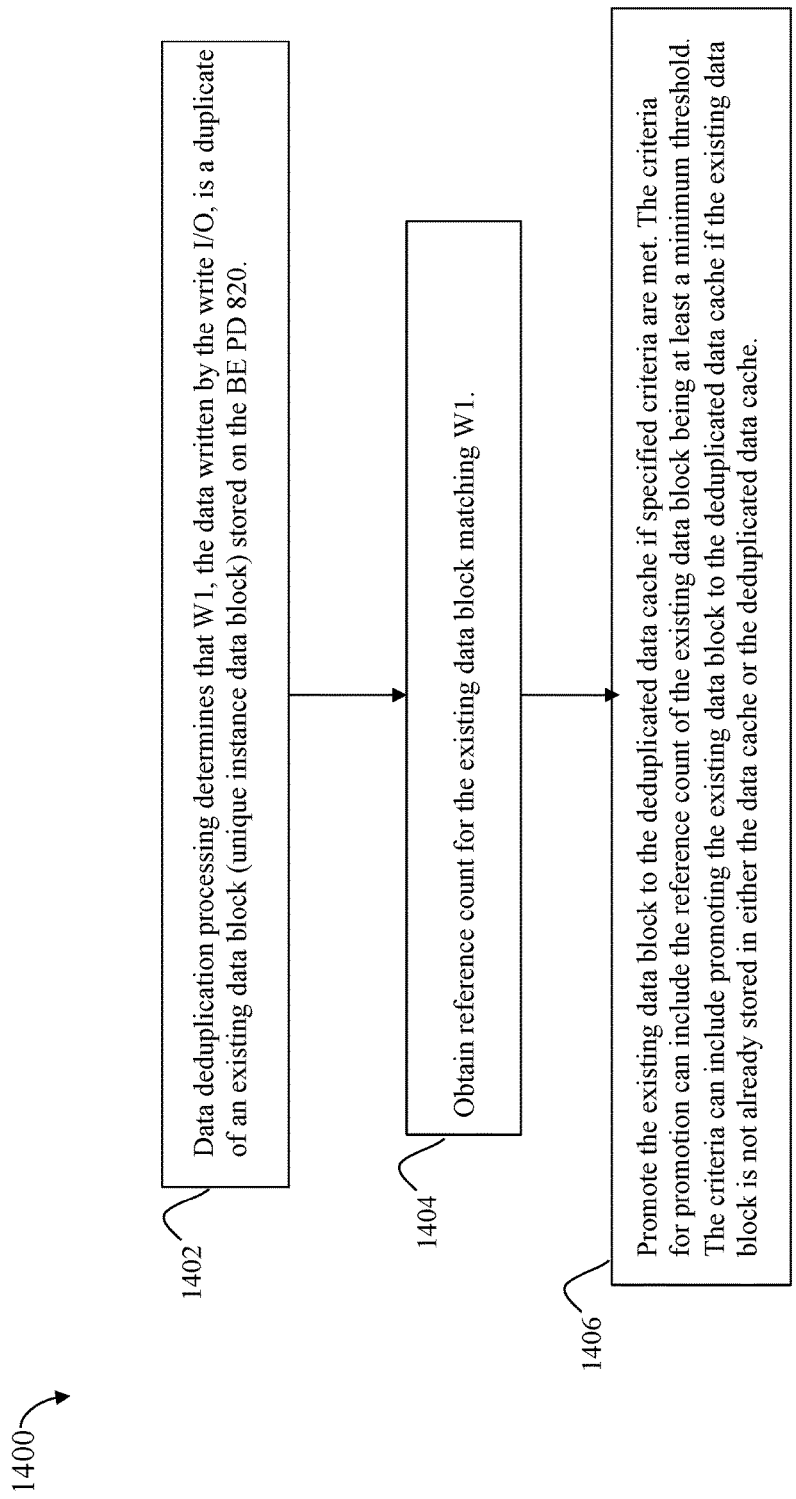

Referring to FIG. 12, shown is a flowchart 1400 of processing that can be performed on the write I/O path when processing the write I/O operation in at least one embodiment in accordance with the techniques of the present disclosure. The flowchart 1400 can be performed as part of processing of the step 1104 of FIG. 11A as part of deduplication processing or after data deduplication processing has completed.

At the step 1402, data deduplication processing has determined that W1, the data written by the write I/O, is a duplicate of an existing data block (unique instance data block) stored on the BE PD 820. From the step 1402, control proceeds to the step 1404.

At the step 1404, the reference count is obtained for the existing data block matching W1. From the step 1404, control proceeds to the step 1406.

At the step 1406, processing can be performed to promote the existing data block to the deduplicated data cache if specified criteria are met. The criteria for promotion can include the reference count of the existing data block being at least a minimum threshold. The criteria can include promoting the existing data block to the deduplicated data cache if the existing data block is not already stored in either the data cache or the deduplicated data cache. Thus, the step 1406 can generally include evaluating the existing data block in accordance with the criteria to determine whether to promote the existing data block to the deduplicated data cache. Examples of conditions that can be included in the one or more criteria used to determine whether to promote a data block to the deduplicated data cache are discussed in connection with the step 1406 and generally elsewhere herein.

In at least one embodiment, data that is promoted to the deduplicated data cache, such as in the step 1406, is not also cached in the data cache, for example, as part of the write I/O processing. Thus, the step 1406 in at least one embodiment can avoid storing the write data (which is promoted to the deduplicated data cache) into the data cache as part of the write I/O path processing. In at least one embodiment, if the step 1406 does not result in promoting the write data to the deduplicated data cache, the write data can be stored in the data cache as part of the write I/O path processing.

In connection with processing a write I/O operation as described above such as, for example, in connection with FIGS. 11A-C, deduplication processing can include querying the deduplicated data cache to determine whether the write data block W1 is a duplicate of an existing data block stored in the deduplicated data cache. If W1 is a duplicate of an existing data block stored in the deduplicated data cache, deduplication makes this determination in an more efficient manner as compared to retrieving the existing data block from the BE PD which incurs additional overhead (e.g., additional processing time to read the existing data block from the BE PD and also to decompress the retrieved data block).

In connection with processing a read I/O operation as described above, such as in connection with FIG. 10, requested data can be read from the deduplicated data cache in a more efficient manner than reading data from the BE PDs in instances where the read I/O operation results in a read cache miss with respect to the data cache.

Consistent with the above discussion in at least one embodiment, a deduplicated data block (e.g., a unique data block instance stored on the BE PD where the unique data block is stored at multiple logical addresses as determined by deduplication processing and where the reference count is more than 1) can be promoted to the data deduplication cache on the data path or I/O path when processing both read and write I/O operations.

As noted above, the one or more criteria used to evaluate whether a data block is promoted to the deduplicated data cache can include a minimum threshold for the reference count. Generally, the minimum threshold for the reference count can be any suitable value. In at least one embodiment, the minimum threshold can be configurable and optimized for each particular embodiment and system using the techniques of the present disclosure. Generally, the minimum threshold can be tuned or optimized based on one or more characteristics of the data storage system such as, for example, the size of the one or more caches, the I/O workload, an observed cache miss or cache hit such as with respect to the deduplicated data cache, an amount of utilization of the deduplicated data cache (e.g., percentage indicating an average amount of the deduplicate data cache that is being used and includes cached data), and the like. In at least one embodiment, the minimum threshold for the reference count can be variable and can be adapted dynamically over time as conditions or parameters regarding the current state of the data storage system vary or change over time.

In at least one embodiment, the deduplicated data cache stores deduplicated data meeting one or more criteria. The criteria can be applied or evaluated with respect to a data block to determine whether to promote the data block to the deduplicated data cache. In at least one embodiment, the criteria can include the following: 1) the data block has been deduplicated by deduplication processing; 2) the data block has an associated reference count meeting or exceeding a specified minimum threshold; and 3) each data block stored in the deduplicated data cache is a single unique instance so that the deduplicated data cache does not include duplicate data blocks or content (e.g., only one copy of each unique data block or content even though the data block is stored or referenced by multiple logical addresses. As a result of criterion 3) above, a data block is not added to the deduplicated data cache if it is already stored in the deduplicated data cache. The criteria can also include 4) that a data block promoted to the deduplicated data cache is not added to the data cache. In at least one embodiment, data stored in the deduplicated data cache can be uncompressed.

In at least one embodiment, the deduplicated data cache can implement a caching policy where cache data is grouped into multiple tiers or tracks based on one or more cache hit metrics with respect to accessing data of the deduplicated data cache. The cache hit metric can be based on, for example, a frequency or rate of cache hits, a cache hit ratio determined with respect to a defined time period or average, and the like. For example, in at least one embodiment, the deduplicated data cache policy can classify a cached data block as belonging to one of the multiple tiers where there may be three such tiers denoted as low, medium and high, where low denotes the lowest tier of cache hit frequency or ratio, medium denotes the second highest tier of cache hit frequency or ratio, and high denotes the highest tier of cache hit frequency or ratio. When a data block is initially promoted to the deduplicated data cache, the data block can be classified as belonging to the low tier. Over time, based on the number of times the cached data block is accessed (e.g., as a result of a cache hit with respect to the deduplicated data cache), the data block can be further promoted within the deduplicated data cache to a higher ranked tier, such as promoted from the low tier to the medium or high tier. For example, a first cache hit threshold can be defined as 10 indicating that once the cached data block is accessed 10 times, such as during a defined time period, the cached data block can be further promoted to the medium tier. While in the medium tier, if the cached data block is accessed at least 50 times during a defined time period, the data block can be further promoted from the medium to the high tier. Generally, an embodiment can define different promotion and also demotion tier thresholds regarding cache hit frequency, rate or ratio used for promoting and demoting cached data between the different tiers and also for eviction or demotion from the deduplicated data cache. Generally, the promotion and demotion tier thresholds can comprise, respectively, promotion and demotion tier criteria affecting the lifetime or amount of time a particular data block is stored in the data deduplication cache.

In at least one embodiment, if data that is cached in the deduplicated data cache needs to be evicted in order to create space for storing new incoming deduplicated data, one or more of the data blocks of the low tier can be evicted from the deduplicated data cache. In at least one embodiment, the deduplicated data cache can further prioritize cached data of the low tier for eviction based on an LRU (least recently used) policy so that the most recently accessed data blocks remain in the cache. Based on the LRU policy, cached data blocks can each have an associated time stamp indicating the last or most recent time that the data block is accessed in connection with a cache hit of the deduplicated data cache. The cached data blocks, such as within each of the tiers, can be prioritized for eviction based on time stamps so that the oldest or least recently accessed data block(s) can be evicted from the deduplicated data cache prior to other data blocks having a more recent time stamp (e.g., more recently accessed). Data can be selected for eviction by selecting data blocks first from the low tier, and within the low tier, based on the LRU policy. In at least one embodiment, for every N data blocks that are evicted from the low tier, one data block can be demoted from the medium to the low tier, where the demoted data block can, for example, be the least recently used data block of the medium tier. In at least one embodiment, for every N data blocks demoted from the medium tier to the low tier, a data block can be demoted from the high tier to the medium tier, where the demoted block can, for example, be the least recently used data block of the high tier.

In connection with accesses made to data stored in the deduplication data cache, the same cached data block can be accessed in connection with multiple different I/O operations directed to multiple different logical addresses. Thus, in at least one embodiment, the metrics collected regarding cache hits with respect to a data block stored in the deduplicated data cache can include accesses in connection with processing read and/or write I/O operations where the accessed data block cached in the deduplicated data cache can denote the content stored at multiple different logical addresses.

In at least one embodiment, when returning requested data, such as for a read I/O operation, and the requested data is stored in the deduplicated data cache, processing can be performed to avoid also storing the returned requested data in the data cache as part of the return path or call stack of the I/O path. In such an embodiment, an indicator or flag can be set and returned from the deduplicated data cache layer to the data cache layer, where the indicator or flag indicates that the returned requested data is cached in the deduplicated data cache and should not also be cached in the data cache as part of the return path for the read I/O operation.

In at least one embodiment, as part of processing a write I/O operation where the write data is stored in the deduplicated data cache, processing can be performed to avoid also storing the write data in the data cache as part of the return path or call stack of the I/O path. In such an embodiment, an indicator or flag can be set and returned from the deduplicated data cache layer to the data cache layer, where the indicator or flag indicates that the write data of the write I/O operation is cached in the deduplicated data cache and should not also be cached in the data cache as part of the return path for the write I/O operation.

In at least one embodiment of a data storage system or appliance that is a dual node appliance such as, for example, described in connection with FIG. 2B, each node can independently implement the techniques of the present disclosure where the caches can be implemented as volatile memory caches of the node.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
receiving a first read I/O operation directed to a first logical address; and
responsive to receiving the first read I/O operation, servicing the first read I/O operation, wherein servicing the first read I/O operation includes:
determining that a data cache does not include a corresponding entry for a first data portion stored at the first logical address thereby resulting in a read cache miss with respect to the data cache, wherein the data cache is organized using logical addresses as data cache keys to access corresponding content stored in the data cache; and
responsive to determining that the data cache does not include the corresponding entry for the first data portion stored at the first logical address thereby resulting in a read cache miss of the data cache, performing first processing including:
determining that the first data portion stored at the first logical address is not stored in a deduplicated data cache;
responsive to determining that the first data portion is not stored in the deduplicated data cache, determining whether the first data portion stored at the first logical address meets criteria for promoting the first data portion to a deduplicated data cache, wherein the criteria includes a first condition that the first data portion is a duplicate of content stored at multiple logical addresses of a logical address space, and wherein the criteria includes a second condition that the first data portion has a reference count that is at least a minimum threshold and wherein the reference count denotes a number of logical addresses of the logical address space at which the first data portion is stored, and wherein the criteria includes a third condition specifying that the first data portion is not promoted to the deduplicated data cache if the first data portion is already cached in at least one entry of the data cache;
responsive to determining that the first data portion meets the criteria for promoting the first data portion to the deduplicated data cache, promoting the first data portion to the deduplicated data cache including storing the first data portion in the deduplicated data cache so that the first data portion is accessible in the deduplicated data cache using an indirect pointer, to a physical storage location of a data block storing the first data portion, as a key; and responsive to determining that the first data portion does not meet the criteria such that the first data portion is not promoted to the deduplicated data cache, caching the first data portion in the data cache including storing the first data portion of the first logical address in the data cache so that the first data portion is accessible in the data cache using the first logical address as a data cache key.

2. The computer-implemented method of claim 1, wherein the deduplicated data cache includes a plurality of entries, wherein each of the entries includes a unique data portion stored in the deduplicated data cache where the unique data portion of said each entry is unique with respect to other data portions stored in the deduplicated data cache, and wherein a particular data portion stored in the deduplicated data cache is accessed using a corresponding key that maps to one of the plurality of entries including the particular data portion.

3. The computer-implemented method of claim 2, wherein the corresponding key used to access the particular data portion is a reference to first metadata of mapping information, wherein the first metadata is used to access a corresponding physical storage location of a particular data block storing the particular data portion, and wherein the mapping information is used to map an associated logical address to the corresponding physical storage location.

4. The computer-implemented method of claim 3, wherein the corresponding key is a first address of a first entry of a structure of the mapping information, wherein the first entry includes a second address denoting the corresponding physical storage location of the particular data block storing the particular data portion.

5. The computer-implemented method of claim 1, wherein the deduplicated data cache includes a plurality of data portions stored in a plurality of entries of the deduplicated data cache, wherein the plurality of entries and the plurality of data portions are accessed using a plurality of keys associated with the plurality of entries.

6. The computer-implemented method of claim 5, wherein each of the plurality of data portions stored in the deduplicated data cache is a single unique instance so that the deduplicated data cache does not include any duplicate data portions.

7. The computer-implemented method of claim 6, wherein each of the plurality of data portions stored in the deduplicated data cache is stored in an uncompressed form.

8. The computer-implemented method of claim 1, wherein the first read I/O operation is a read I/O operation that reads the first data portion stored at the first logical address.

9. The computer-implemented method of claim 8, and wherein said first processing of said servicing the first read I/O operation further comprises:

reading mapping information for the first logical address to obtain first metadata of the mapping information, wherein the mapping information maps the first logical address to a first data block storing the first data portion, and wherein the first metadata is a reference used to access the first data block and retrieve the first data portion stored at the first data block;

determining, using the first metadata as a first key for the first data portion, that the first data portion is not stored in the deduplicated data cache;

reading, using the first metadata, the first data portion from the first data block, wherein said storing the first data portion in the deduplicated data cache is performed after said reading, and wherein said storing the first data portion in the deduplicated data cache stores the first data portion read from the first data block by said reading; and returning the first data portion in response to the first read I/O operation.

10. The computer-implemented method of claim 9, wherein the first data portion is stored in a compressed form at the first data block, wherein said reading includes decompressing the first data portion from the compressed form to an uncompressed form, and wherein said storing the first data portion in the deduplicated data cache stores the uncompressed form of the first data portion in the deduplicated data cache.

11. The computer-implemented method of claim 10, further comprising:

receiving a second read I/O operation directed to a second logical address, wherein the second read I/O operation is received after said servicing the first read I/O operation has completed;

determining that the data cache does not include an entry for data stored at the second logical address thereby resulting in a read cache miss with respect to the data cache;

reading second mapping information for the second logical address to obtain the first metadata of the second mapping information, wherein the second mapping information maps the second logical address to the first data block storing the first data portion, and wherein the first metadata is a reference used to access the first data block and retrieve the first data portion stored at the first data block;

determining, using the first metadata as the first key for the first data portion, that the first data portion is stored in the deduplicated data cache;

reading, using the first metadata, the first data portion from the deduplicated data cache; and returning the first data portion in response to the second read I/O operation.

12. The computer-implemented method of claim 1, further comprising:

receiving a write I/O operation that writes the first data portion to the first logical address; and servicing the write I/O operation, wherein said servicing the write I/O operation includes performing data deduplication processing, and wherein said data deduplication processing further comprises:

determining that the first data portion is a duplicate of an existing unique copy of the first data portion stored at a first storage location on non-volatile storage;

incrementing the reference count associated with the existing unique copy of the first data portion stored at the first storage location; and generating mapping information that maps the first logical address to the first storage location at which the existing unique copy of the first data portion is stored on the non-volatile storage.

13. The computer-implemented method of claim 1, wherein said deduplicated data cache includes a plurality of data portions of a plurality of tiers, wherein each of the plurality of tiers denotes a different frequency of access.

14. The computer-implemented method of claim 13, wherein the plurality of tiers includes a first tier denoting a lowest or minimum frequency of access with respect to the plurality of tiers, and wherein the computer-implemented method includes:
selecting one or more data portions of the first tier for eviction from the deduplicated data cache.

15. The computer-implemented method of claim 14, wherein the one or more data portions selected by said selecting are least recently used with respect to all data portions included in the first tier.

16. A non-transitory computer readable medium comprising code stored thereon that, when executed, performs a method comprising:
receiving a first read I/O operation directed to a first logical address; and
responsive to receiving the first read I/O operation, servicing the first read I/O operation, wherein servicing the first read I/O operation includes:
determining that a data cache does not include a corresponding entry for a first data portion stored at the first logical address thereby resulting in a read cache miss with respect to the data cache, wherein the data cache is organized using logical addresses as data cache keys to access corresponding content stored in the data cache; and
responsive to determining that the data cache does not include the corresponding entry for the first data portion stored at the first logical address thereby resulting in a read cache miss of the data cache, performing first processing including:
determining that the first data portion stored at the first logical address is not stored in a deduplicated data cache;
responsive to determining that the first data portion is not stored in the deduplicated data cache, determining whether the first data portion stored at the first logical address meets criteria for promoting the first data portion to a deduplicated data cache, wherein the criteria includes a first condition that the first data portion is a duplicate of content stored at multiple logical addresses of a logical address space, and wherein the criteria includes a second condition that the first data portion has a reference count that is at least a minimum threshold and wherein the reference count denotes a number of logical addresses of the logical address space at which the first data portion is stored, and wherein the criteria includes a third condition specifying that the first data portion is not promoted to the deduplicated data cache if the first data portion is already cached in at least one entry of the data cache;
responsive to determining that the first data portion meets the criteria for promoting the first data portion to the deduplicated data cache, promoting the first data portion to the deduplicated data cache including storing the first data portion in the deduplicated data cache so that the first data portion is accessible in the deduplicated data cache using an indirect pointer, to a physical storage location of a data block storing the first data portion, as a key; and
responsive to determining that the first data portion does not meet the criteria such that the first data portion is not promoted to the deduplicated data cache, caching the first data portion in the data cache including storing the first data portion of the first logical address in the data cache so that the first data portion is accessible in the data cache using the first logical address as a data cache key.

17. The non-transitory computer readable medium of claim 16, wherein the deduplicated data cache includes a plurality of entries, wherein each of the entries includes a unique data portion stored in the deduplicated data cache where the unique data portion of said each entry is unique with respect to other data portions stored in the deduplicated data cache, and wherein a particular data portion stored in the deduplicated data cache is accessed using a corresponding key that maps to one of the plurality of entries including the particular data portion.

18. A system comprising:
one or more processors; and
a memory comprising code stored thereon that, when executed, performs a method comprising:
receiving a first read I/O operation directed to a first logical address; and
responsive to receiving the first read I/O operation, servicing the first read I/O operation, wherein servicing the first read I/O operation includes:
determining that a data cache does not include a corresponding entry for a first data portion stored at the first logical address thereby resulting in a read cache miss with respect to the data cache, wherein the data cache is organized using logical addresses as data cache keys to access corresponding content stored in the data cache; and
responsive to determining that the data cache does not include the corresponding entry for the first data portion stored at the first logical address thereby resulting in a read cache miss of the data cache, performing first processing including:
determining that the first data portion stored at the first logical address is not stored in a deduplicated data cache;
responsive to determining that the first data portion is not stored in the deduplicated data cache, determining whether the first data portion stored at the first logical address meets criteria for promoting the first data portion to a deduplicated data cache, wherein the criteria includes a first condition that the first data portion is a duplicate of content stored at multiple logical addresses of a logical address space, and wherein the criteria includes a second condition that the first data portion has a reference count that is at least a minimum threshold and wherein the reference count denotes a number of logical addresses of the logical address space at which the first data portion is stored, and wherein the criteria includes a third condition specifying that the first data portion is not promoted to the deduplicated data cache if the first data portion is already cached in at least one entry of the data cache;
responsive to determining that the first data portion meets the criteria for promoting the first data portion to the deduplicated data cache, promoting the first data portion to the deduplicated data cache including storing the first data portion in the deduplicated data cache so that the first data portion is accessible in the deduplicated data cache using an indirect pointer, to a physical storage location of a data block storing the first data portion, as a key; and responsive to determining that the first data portion does not meet the criteria such that the first data portion is not promoted to the deduplicated data cache, caching the first data portion in the data cache including storing the first data portion of the first logical address in the data cache so that the first data portion is accessible in the data cache using the first logical address as a data cache key.

19. The system of claim 18, wherein the deduplicated data cache includes a plurality of entries, wherein each of the entries includes a unique data portion stored in the deduplicated data cache where the unique data portion of said each entry is unique with respect to other data portions stored in the deduplicated data cache, and wherein a particular data portion stored in the deduplicated data cache is accessed using a corresponding key that maps to one of the plurality of entries including the particular data portion.

* * * * *